US010694337B2

(12) United States Patent
Chan et al.

(10) Patent No.: US 10,694,337 B2
(45) Date of Patent: *Jun. 23, 2020

(54) MANAGING USER DATA ON AN ELECTRONIC DEVICE

(71) Applicant: Razer (Asia-Pacific) Pte. Ltd., Singapore (SG)

(72) Inventors: Michael A. Chan, San Francisco, CA (US); Justin Quan, San Francisco, CA (US); Matthew Blake Engel, San Francisco, CA (US); Christopher David Nesladek, San Francisco, CA (US); Jeffrey Scott Croyle, San Francisco, CA (US)

(73) Assignee: Razer (Asia-Pacific) Pte. Ltd., Singapore (SG)

(*) Notice: Subject to any disclaimer, the term of this patent is extended or adjusted under 35 U.S.C. 154(b) by 6 days.

This patent is subject to a terminal disclaimer.

(21) Appl. No.: 16/038,448

(22) Filed: Jul. 18, 2018

(65) Prior Publication Data
US 2018/0324557 A1 Nov. 8, 2018

Related U.S. Application Data

(63) Continuation of application No. 14/674,048, filed on Mar. 31, 2015, now Pat. No. 10,057,726, which is a (Continued)

(51) Int. Cl.
*H04L 12/00* (2006.01)
*H04W 4/029* (2018.01)
(Continued)

(52) U.S. Cl.
CPC .......... *H04W 4/029* (2018.02); *G06F 3/0482* (2013.01); *G06F 16/125* (2019.01); *H04L 67/06* (2013.01);
(Continued)

(58) Field of Classification Search
CPC .. G06F 16/93; G06F 3/0482; G06F 17/30085; H04W 4/029; H04W 4/028
(Continued)

(56) References Cited

U.S. PATENT DOCUMENTS 5,446,901 A 8/1995 Owicki
5,925,100 A 7/1999 Drewry et al.
(Continued)

FOREIGN PATENT DOCUMENTS

CN 101692239 A 4/2010

OTHER PUBLICATIONS

Co-Pending U.S. Appl. No. 14/248,219 of Chan, M.A. et al., filed Apr. 8, 2014.
(Continued)

*Primary Examiner* — Frantz Coby
(74) *Attorney, Agent, or Firm* — Mattingly & Malur, PC

(57) ABSTRACT

Some examples include determining, by one or more processors, that both a first electronic device and a second electronic device are to be accessible at least in part during an event. Further, the one or more processors may determine user data stored on the first electronic device, the second electronic device, and a network storage. In addition, the one or more processors may determine, based at least in part on the user data stored on, or to be stored on, the second electronic device prior to the event, user data to download to the first electronic device from the network storage prior to the event.

16 Claims, 16 Drawing Sheets

Related U.S. Application Data continuation-in-part of application No. 14/180,021, filed on Feb. 13, 2014, now Pat. No. 9,811,329, which is a continuation of application No. PCT/US2013/063003, filed on Oct. 2, 2013.

(60) Provisional application No. 61/708,794, filed on Oct. 2, 2012, provisional application No. 62/067,532, filed on Oct. 23, 2014.

(51) Int. Cl.
    *H04L 29/08* (2006.01)
    *G06F 3/0482* (2013.01)
    *G06F 16/11* (2019.01)

(52) U.S. Cl.
    CPC ...... *H04L 67/1095* (2013.01); *H04L 67/1097* (2013.01); *H04L 67/2852* (2013.01)

(58) Field of Classification Search
    USPC .................................. 709/219, 217; 707/827
    See application file for complete search history.

(56) References Cited

U.S. PATENT DOCUMENTS

| | | | |
|---|---|---|---|
| 6,085,226 A | 7/2000 | Horvitz | |
| 6,163,506 A * | 12/2000 | Mundy | G06F 9/4825 368/10 |
| 6,230,319 B1 * | 5/2001 | Britt, Jr. | G06F 3/04892 717/173 |
| 6,279,046 B1 | 8/2001 | Armstrong | |
| 6,286,080 B1 | 9/2001 | Galbraith et al. | |
| 6,378,071 B1 | 4/2002 | Sasaki | |
| 6,385,641 B1 | 5/2002 | Jiang et al. | |
| 6,412,021 B1 | 6/2002 | Nguyen | |
| 6,505,245 B1 | 1/2003 | North | |
| 6,584,498 B2 | 6/2003 | Nguyen | |
| 6,697,791 B2 | 2/2004 | Hellerstein | |
| 6,721,870 B1 | 4/2004 | Yochai et al. | |
| 6,757,696 B2 | 6/2004 | Multer et al. | |
| 6,788,315 B1 | 9/2004 | Kekic | |
| 6,857,020 B1 | 2/2005 | Chaar | |
| 6,877,065 B2 | 4/2005 | Galbraith et al. | |
| 6,918,113 B2 | 7/2005 | Patel et al. | |
| 6,922,724 B1 | 7/2005 | Freeman | |
| 6,944,819 B2 | 9/2005 | Banatwala et al. | |
| 6,959,320 B2 | 10/2005 | Shah et al. | |
| 6,965,886 B2 | 11/2005 | Govrin | |
| 6,996,551 B2 | 2/2006 | Hellerstein | |
| 7,043,524 B2 | 5/2006 | Shah et al. | |
| 7,062,567 B2 | 6/2006 | Benitez et al. | |
| 7,065,556 B1 * | 6/2006 | Hickey | G06F 11/3476 709/202 |
| 7,072,914 B2 | 7/2006 | Cabrera et al. | |
| 7,124,110 B1 | 10/2006 | Kemp et al. | |
| 7,124,272 B1 | 10/2006 | Kennedy et al. | |
| 7,130,866 B2 | 10/2006 | Schaffer | |
| 7,155,465 B2 | 12/2006 | Lee et al. | |
| 7,222,186 B2 | 5/2007 | Kobayashi | |
| 7,228,354 B2 | 6/2007 | Chambliss et al. | |
| 7,260,672 B2 | 8/2007 | Garney | |
| 7,287,063 B2 | 10/2007 | Baldwin | |
| 7,333,024 B2 | 2/2008 | Nickolaou | |
| 7,430,633 B2 * | 9/2008 | Church | G06Q 30/0277 705/14.73 |
| 7,506,317 B2 | 3/2009 | Liang | |
| 7,533,230 B2 | 5/2009 | Glover et al. | |
| 7,617,250 B2 | 11/2009 | Xu et al. | |
| 7,676,630 B2 | 3/2010 | Qiao | |
| 7,698,517 B2 | 4/2010 | Tulyani | |
| 7,725,565 B2 * | 5/2010 | Li | G06Q 10/067 709/219 |
| 7,783,666 B1 | 8/2010 | Zhuge et al. | |
| 7,792,792 B2 | 9/2010 | Witriol et al. | |
| 7,849,307 B2 | 12/2010 | Roskind | |
| 7,882,304 B2 | 2/2011 | English et al. | |
| 7,917,494 B2 | 3/2011 | Muller | |
| 8,019,811 B1 | 9/2011 | Britto et al. | |
| 8,082,292 B2 | 12/2011 | Karmakar | |
| 8,136,089 B2 | 3/2012 | Snodgrass et al. | |
| 8,139,820 B2 * | 3/2012 | Plante | G07C 5/008 340/438 |
| 8,160,573 B2 | 4/2012 | Griffith | |
| 8,245,012 B2 | 8/2012 | Krauss | |
| 8,312,102 B2 | 11/2012 | Grinberg | |
| 8,326,793 B1 | 12/2012 | Bowers et al. | |
| 8,438,298 B2 | 5/2013 | Arai et al. | |
| 8,456,972 B2 | 6/2013 | Mehra et al. | |
| 8,509,488 B1 | 8/2013 | Enge et al. | |
| 8,515,904 B1 | 8/2013 | Dwyer et al. | |
| 8,539,163 B1 | 9/2013 | Sivasubramanian et al. | |
| 8,566,788 B2 | 10/2013 | Snodgrass et al. | |
| 8,635,219 B2 | 1/2014 | Chakra et al. | |
| 8,650,164 B2 | 2/2014 | Rothschild et al. | |
| 8,706,755 B2 | 4/2014 | Patel et al. | |
| 8,732,406 B1 | 5/2014 | Pase et al. | |
| 8,769,210 B2 | 7/2014 | Bell et al. | |
| 8,775,487 B2 | 7/2014 | Uhrhane et al. | |
| 8,788,628 B1 | 7/2014 | Taylor et al. | |
| 8,805,406 B1 | 8/2014 | Casaburi et al. | |
| 8,831,352 B2 | 9/2014 | Gao | |
| 8,892,507 B1 | 11/2014 | Dwyer et al. | |
| 8,954,730 B2 | 2/2015 | Roskind | |
| 8,959,118 B2 | 2/2015 | Anderson et al. | |
| 8,972,690 B2 | 3/2015 | Horn et al. | |
| 9,014,736 B2 | 4/2015 | Hart | |
| 9,052,826 B2 | 6/2015 | Quan et al. | |
| 9,183,679 B2 * | 11/2015 | Plante | H04N 5/76 |
| 9,311,499 B2 * | 4/2016 | Redlich | G06F 21/6209 |
| 9,383,947 B2 | 7/2016 | Sinn et al. | |
| 9,426,230 B2 | 8/2016 | Anderson | |
| 9,449,021 B2 | 9/2016 | Slegers et al. | |
| 2002/0083183 A1 | 6/2002 | Pujare et al. | |
| 2002/0133537 A1 | 9/2002 | Lau et al. | |
| 2003/0154116 A1 | 8/2003 | Lofton | |
| 2003/0200282 A1 | 10/2003 | Arnold et al. | |
| 2004/0098383 A1 | 5/2004 | Tabellion et al. | |
| 2004/0138931 A1 * | 7/2004 | Hope | G06Q 10/06 719/315 |
| 2004/0205633 A1 | 10/2004 | Martinez et al. | |
| 2004/0210591 A1 | 10/2004 | Hirschfeld et al. | |
| 2005/0066134 A1 | 3/2005 | Tormasov et al. | |
| 2005/0222996 A1 * | 10/2005 | Yalamanchi | G06F 16/24 |
| 2005/0240875 A1 | 10/2005 | Takayama et al. | |
| 2006/0008508 A1 | 1/2006 | Maurer | |
| 2006/0069665 A1 | 3/2006 | Yamakawa et al. | |
| 2006/0095705 A1 | 5/2006 | Wichelman et al. | |
| 2006/0129778 A1 | 6/2006 | Clark | |
| 2006/0161686 A1 * | 7/2006 | Mossakowski | H04N 5/772 709/247 |
| 2006/0264197 A1 | 11/2006 | Mahini | |
| 2006/0265426 A1 | 11/2006 | Chen | |
| 2007/0067382 A1 | 3/2007 | Sun | |
| 2007/0076312 A1 * | 4/2007 | Jordan | G07C 5/085 360/32 |
| 2007/0078770 A1 | 4/2007 | Hsieh | |
| 2007/0150905 A1 * | 6/2007 | Cassorla | G06F 9/542 719/318 |
| 2007/0240065 A1 | 10/2007 | Alperin et al. | |
| 2007/0255759 A1 * | 11/2007 | Akelbein | G06F 16/122 |
| 2008/0071988 A1 | 3/2008 | Schloter et al. | |
| 2008/0140997 A1 | 6/2008 | Tripathi | |
| 2008/0162592 A1 * | 7/2008 | Huang | G06F 11/3476 |
| 2008/0177803 A1 | 7/2008 | Fineberg et al. | |
| 2008/0178298 A1 | 7/2008 | Arai et al. | |
| 2008/0183903 A1 | 7/2008 | Vanstee et al. | |
| 2008/0196065 A1 | 8/2008 | Cheng | |
| 2008/0212421 A1 | 9/2008 | Kitagawa | |
| 2008/0250024 A1 | 10/2008 | Kim et al. | |
| 2009/0043984 A1 * | 2/2009 | Chang | G06F 3/0608 711/173 |
| 2009/0144283 A1 | 6/2009 | Clark | |

(56) References Cited

U.S. PATENT DOCUMENTS

| | | |
|---|---|---|
| 2009/0276843 A1* | 11/2009 | Patel .................. H04L 43/00 726/13 |
| 2010/0010967 A1 | 1/2010 | Muller |
| 2010/0036858 A1 | 2/2010 | Patel |
| 2010/0088369 A1 | 4/2010 | Sebastian et al. |
| 2010/0115211 A1 | 5/2010 | De La Iglesia et al. |
| 2010/0153487 A1* | 6/2010 | Greven ............... G06Q 10/109 709/203 |
| 2010/0138613 A1 | 9/2010 | Parker |
| 2010/0325199 A1 | 12/2010 | Park et al. |
| 2011/0252071 A1 | 10/2011 | Cidon |
| 2011/0320558 A1 | 12/2011 | Gross et al. |
| 2012/0066439 A1 | 3/2012 | Fillingm |
| 2012/0078727 A1 | 3/2012 | Lee |
| 2012/0078946 A1 | 3/2012 | Darcy |
| 2012/0084151 A1 | 4/2012 | Kozak et al. |
| 2012/0084348 A1 | 4/2012 | Lee et al. |
| 2012/0084349 A1 | 4/2012 | Lee et al. |
| 2012/0151255 A1 | 6/2012 | Lee et al. |
| 2012/0233522 A1 | 9/2012 | Barton et al. |
| 2012/0259849 A1 | 10/2012 | Deodhar et al. |
| 2012/0265805 A1* | 10/2012 | Samdadiya ......... G06F 11/3466 709/203 |
| 2012/0296882 A1 | 11/2012 | Lee |
| 2013/0024540 A1 | 1/2013 | Such |
| 2013/0031204 A1 | 1/2013 | Graham et al. |
| 2013/0067168 A1 | 3/2013 | Havewala et al. |
| 2013/0110985 A1 | 5/2013 | Shekher et al. |
| 2013/0174046 A1 | 7/2013 | Lim et al. |
| 2013/0185258 A1 | 7/2013 | Bestler et al. |
| 2013/0210527 A1 | 8/2013 | Kim et al. |
| 2013/0318306 A1 | 11/2013 | Gonion |
| 2013/0339407 A1 | 12/2013 | Sharpe et al. |
| 2014/0006354 A1 | 1/2014 | Parkison et al. |
| 2014/0006357 A1 | 1/2014 | Davis et al. |
| 2014/0006465 A1 | 1/2014 | Davis et al. |
| 2014/0007329 A1 | 1/2014 | Dosio |
| 2014/0025921 A1* | 1/2014 | Yuan .................... G06F 12/1009 711/206 |
| 2014/0040197 A1* | 2/2014 | Wijayaratne .......... G06F 16/178 707/625 |
| 2014/0059306 A1* | 2/2014 | Bender ............... G06F 11/3034 711/162 |
| 2014/0101106 A1 | 4/2014 | Lee et al. |
| 2014/0108335 A1 | 4/2014 | Chan et al. |
| 2015/0052178 A1 | 2/2015 | Zhong |
| 2015/0286444 A1 | 10/2015 | Sinn et al. |
| 2015/0381647 A1 | 12/2015 | Huang |

OTHER PUBLICATIONS

Co-Pending U.S. Appl. No. 14/271,738 of Chan, M.A. et al., filed May 7, 2014.

Notice of Allowance dated May 5, 2014, for U.S. Appl. No. 14/171,679 by Chan, M.A. et al., filed Feb. 3, 2014.

Non-Final Office Action dated Apr. 4, 2014, for U.S. Appl. No. 14/171,679 by Chan, M.A. et al., filed Feb. 3, 2014.

Co-Pending U.S. Appl. No. 14/042,452 by Chan, M.A. et al., filed Sep. 30, 2013.

Co-Pending U.S. Appl. No. 14/043,693 by Chan, M.A. et al., filed Oct. 1, 2013.

Co-Pending U.S. Appl. No. 14/043,082 by Chan, M.A. et al., filed Oct. 1, 2013.

Co-Pending U.S. Appl. No. 14/155,067 by Chan, M.A. et al., filed Jan. 14, 2014.

Co-Pending U.S. Appl. No. 14/171,679 by Chan, M.A. et al., filed Feb. 3, 2014.

Notice of Allowance dated Mar. 31, 2014 for U.S. Appl. No. 14/155,067 by Chan, M.A. et al., filed Jan. 14, 2014.

International Search Report and Written Opinion of International Application No. PCT/US2013/063003 dated Jan. 22, 2014.

U.S. Non-Final Office Action received in corresponding U.S. Appl. No. 14/835,993 dated Dec. 4, 2017.

* cited by examiner

MANAGING USER DATA ON AN ELECTRONIC DEVICE

CROSS-REFERENCES TO RELATED APPLICATIONS

This application is a continuation of, and claims priority to, U.S. patent application Ser. No. 14/674,048, filed Mar. 31, 2015, which is a continuation-in-part of, and claims priority to, U.S. patent application Ser. No. 14/180,021, filed on Feb. 13, 2014. In turn, U.S. patent application Ser. No. 14/180,021 is a continuation of, and claims priority to, International Application No. PCT/US2013/063003, filed on Oct. 2, 2013, which claims the benefit of, and claims priority to, U.S. Provisional Patent Application No. 61/708,794, filed on Oct. 2, 2012. In turn, U.S. patent application Ser. No. 14/674,048 further claims the benefit of, and claims priority to, U.S. Provisional Patent Application No. 62/067,532, filed on Oct. 23, 2014. All of the above-listed applications are incorporated by reference herein, in their entireties, for all purposes.

BACKGROUND

People use mobile electronic devices for communication, entertainment, work, navigation, and a variety of other functions. However, these mobile electronic devices typically have limited onboard storage space, thus restricting the amount of data that a user may maintain on a particular electronic device. Further, while a user may be able to store additional data with a cloud storage service, the data stored at the cloud storage service is not accessible when the user's electronic device is not able to communicate with a suitable network. Consequently, when a user's electronic device is offline, the user may not be able to access desired data until a connection to a network is available, thereby limiting the usefulness of the electronic device.

SUMMARY

Some implementations herein include techniques and arrangements for managing data available to a user on an electronic device. For instance, an event determination module may determine that an upcoming event involving the electronic device may take place, such as the electronic device being out of communication with a network, the electronic device running out of local storage space, or the like. A data management module may receive event information from the event determination module. In response, the data management module may determine, based at least in part on an event category of the upcoming event and/or other considerations, one or more first pieces of user data stored at a network storage to download to the electronic device prior to the event. Further, the data management module may determine one or more second pieces of user data to delete from a local storage of the electronic device to make room, at least in part, for the one or more first pieces of user data that are recommended to be downloaded to the electronic device for the event. In some cases, the data management module may present, in one or more graphic user interfaces (GUIs), a ranked list of user data recommended for download, and another ranked list of user data recommended for deletion from the local storage. Thus, a user may have the opportunity to view and/or approve the data to be downloaded and the data to be offloaded.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
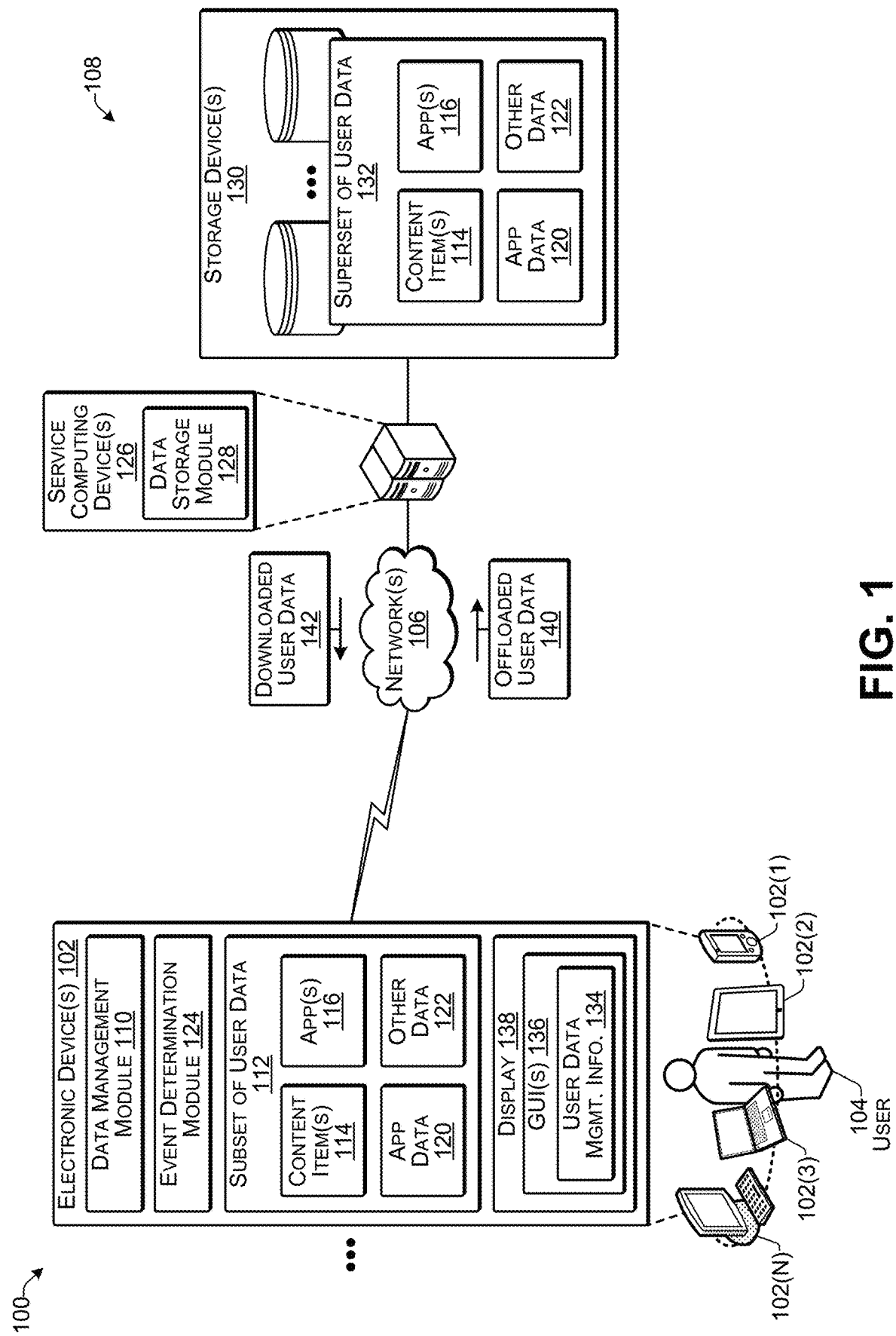
FIG. 1 illustrates an example system for enabling data management on one or more electronic devices according to some implementations.

Some examples herein are directed to management of user data on an electronic device. The electronic device may be any suitable type of computing device, e.g., mobile, semi-portable, semi-stationary, or stationary. Some examples of the electronic device may include tablet computing devices, smart phones, wearable computing devices or body-mounted computing devices, and other types of mobile devices; laptops, netbooks and other portable computers or semi-portable computers; desktop computing devices, terminal computing devices and other semi-stationary or stationary computing devices; augmented reality devices and gaming systems; or any of various other computing devices capable of storing data, sending communications, and performing the functions according to the techniques described herein.

In some cases, the electronic device may determine and control which user data is stored on the electronic device and which user data is stored at a network storage location or on other electronic devices associated with the user. Examples of user data that can be managed according to some implementations herein may include digital content items (e.g., movies, TV shows, videos, pictures, music and other audio files, books and other text documents), applications, application data, operating system modules, operating system data, metadata, other types of files, data structures, and so forth. Thus, as used herein, user data may include applications and associated application data, other programs and program data, and other types of files, as well as digital content items.

In some instances, the electronic device may determine that it is likely to be out of communication with the Internet or other network connection in the near future, such as, during a flight, during travel outside network coverage, during travel to a location where network connection may be unreliable, during an expected or possible network outage, or the like. In anticipation of such an event, the electronic device may generate a list of data to recommend to the user for pre-loading onto the electronic device prior to the event. For instance, the user can pin or otherwise select some or all of the recommended data to be loaded onto the electronic device. As another example, the electronic device can automatically determine and download from the network storage the data that is recommended for a prospective event. In either case, the electronic device can make the recommended data locally available so that the user will be able to access the recommended data while the mobile is device is offline or otherwise being used during the event.

In some cases, the electronic device may create space in the local storage for the data recommended for downloading by moving other user data off the electronic device for storage at the network storage. As one example, the electronic device may automatically offload the other user data to the network storage, such as based on one or more user preferences or various other factors as discussed below. As another example, the user may be presented with a list of data to be offloaded and the user may unpin, approve, or otherwise select the user data to be offloaded from the electronic device. Further, since the user data on the electronic device may be regularly backed up or otherwise synchronized with the user data at the network storage, in some examples, offloading a particular piece of data from the electronic device to the network storage may merely include ensuring the latest version of the particular piece of data has already be synchronized with the network storage, and indicating that the particular piece of data is to be deleted.

The electronic device may take into consideration a plurality of factors when determining user data to recommend for downloading and/or offloading. For instance, based on one or more user data usage models, priority rules, expressed user preferences, or other user data ranking techniques, the electronic device may determine which user data is likely to be used by the user during the event and which user data is unlikely to be used during the event. As one example, the electronic device may rank the user data, at least in part based on the recentness associated with particular pieces of the user data. For instance, a recently purchased content item that has not yet been viewed or otherwise consumed by the user might be a piece of user data recommended for downloading, while a recently consumed content item might be a piece of user data recommended for off-loading. For instance, if the user completely finished viewing a particular movie, then that movie might be recommended for offloading. On the other hand, if the user only viewed a portion of the movie, then that movie might not be recommended for offloading. Further, in some cases, the portion of the movie that has already been viewed might be offloaded, while the remaining portion of the movie that has not yet been viewed might be retained in the local storage of the electronic device to enable the user to finish viewing the movie.

As another example, the electronic device may recommend for downloading user data that was used by the user for similar events in the past. For instance, if a user typically uses certain applications on a flight, during travel, or during other events in similar event categories, the electronic device may recommend that those applications and associated application data be loaded onto the electronic device.

As still another example, the electronic device may consider whether other instances of a particular piece of user data are stored on other electronic devices of the user that will likely be proximate to the user, or otherwise accessible to the user, during the event. For example, if the electronic device is a mobile phone, and the user usually also travels with a tablet, then the determination of which pieces of user data are recommended to be downloaded onto the phone or offloaded from the phone may take into consideration user data that is already on the tablet, or that will be loaded onto the tablet prior to the event. For instance, if a particular recently purchased movie is already stored on the tablet, then there may be a lower priority for the particular movie to also be loaded onto the user's phone.

As one example, suppose that the electronic device is determining user data to recommend be accessible during an upcoming flight. In such a case, particular factors considered for determining user data rankings may include: with whom the user is traveling; where the user is traveling to; whether the trip is for business or pleasure; with what other devices the user is traveling; how long the flight will be; what the user typically uses the electronic device for on a flight, and so forth. Additionally, the recommendations for downloading and/or offloading user data may take into consideration whether the particular types of data are likely to be used during an offline period, e.g., in the case of a movie, TV show, book, or other content item, whether the user has completed viewing or otherwise consuming the content, and whether the user is likely to consume the content again during the offline period. For example, if the user has already consumed the content multiple times, then this may indicate that the user is likely to want to have the content available for repeat consumption.

Additionally, images, such as photos and videos that are not expected to be frequently accessed may be offloaded, at least in part. For instance, higher resolution versions of newer photos and videos may be retained on the electronic device for a period of time. After the period of time has elapsed, the photos and videos may be downsampled to lower resolution versions that are retained in the local storage of the electronic device, while the higher resolution versions are offloaded to the network storage. Accordingly, all of the user's photos and videos may be retained on the electronic device, but the older photos and videos may be retained at a lower resolution than that of the more recent photos and videos, thereby freeing up storage space on the electronic device for additional user data. For some categories of events, such as a family reunion, the higher resolution versions of the images may be recommended to be loaded back onto the electronic device for the duration of the event, and then offloaded back to the network storage.

Some implementations include one or more graphic user interfaces (GUIs) that enable the user to interact with the electronic device to accomplish data management on the electronic device, the network storage, and/or on other electronic device associated with the user. For instance, the GUIs may provide the user with an opportunity to select content items, applications, or other user data to be preloaded onto the electronic device prior to an event, and/or offloaded from the electronic device. The GUIs may present the user data recommended for downloading and/or offloading in a ranked order, such as based on a likelihood that the user will use (or not use in the case of offloading) the recommended user data during the event. In other examples, rather than presenting recommendations for user approval, the electronic device may proceed with downloading and/or offloading the recommended user data according the ranked order, and may present the user with information regarding storage locations where particular pieces of user data are stored.

In some instances, the downloading and/or offloading may be performed based on anticipated user activity and/or in response to user indicated events, which may be referred to generally herein as events. For instance, the electronic device may detect that certain events are scheduled to occur, e.g., from scanning the user's calendar or based on other activity determined by the electronic device. As another example, the user may directly inform the electronic device of an upcoming event, or may otherwise schedule data management for an upcoming event. For instance, if the user is planning to drive through a portion of the country with no cellular service or unreliable network connection, the user may provide this information to the electronic device and may receive the user data recommendations for managing the user data on the electronic device based at least in part on this upcoming event.

Furthermore, an event does not necessarily mean that the electronic device is out of communication with a network. Preparation for other categories of events may include downloading and offloading data for an event even though the electronic device is expected to be in communication with a network during the event. As one example, the event may include installing a new version of an operating system on the electronic device. The electronic device may automatically offload recommended user data to network storage to provide sufficient local storage space to enable download and installation of the new version of the operating system.

As another example, suppose that the user will be attending a wedding, and in anticipation of this event, the electronic device may offload a certain amount of user data to make room in the local storage for the addition of an expected number of new pictures and/or videos. As still another example, suppose that the user works part-time as a DJ, but normally only keeps a first portion of his or her music collection on the electronic device, while a second portion of the music collection is stored on the network storage. In anticipation of the user working as a DJ on a particular night, the second portion of user's music collection may be loaded onto the electronic device. The second portion may then be offloaded back to the network storage when the user has finished working as a DJ, such as while the user is sleeping.

As still another example, the electronic device may automatically and dynamically offload some user data during an event to enable the user to continue to add new data to the local storage on the electronic device. For example, suppose that the user is using the electronic device to take photographs or video. Further, supposed that the electronic device determines that that the user is close to running out of storage space on the electronic device, e.g., has arrived at a threshold amount of storage capacity remaining. If the electronic device is able to communicate with the network storage, the electronic device may offload user data based on a priority that is determined at least in part on current and/or predicted usage of the device in the near term, i.e., during the current event. For instance, if the electronic device is in communication with the network storage, the electronic device may downsample older photos and videos, and offload the higher resolution versions of these images while the user continues to take new photos or videos. Alternatively, if the device is offline, the device may downsample photos or videos that have already been stored to the network storage, or may overwrite other user data that is already stored on the network storage to enable the user to continue to take pictures, videos, or the like. The determination regarding which user data to overwrite may be based at least in part on the data rankings determined for the current event, e.g., based on an event category of the current event.

For discussion purposes, some example implementations are described in the environment of a module on an electronic device that manages the user data available on the electronic device based on various priorities, user preferences, or other considerations. However, implementations herein are not limited to the particular examples provided, and may be extended to other types of devices, other module execution environments, other system architectures, other techniques for determining data priorities, and so forth, as will be apparent to those of skill in the art in light of the disclosure herein.

FIG. 1 illustrates an example system 100 for enabling management of user data according to some implementations. For instance, the environment 100 may enable one or more electronic devices 102 associated with a user 104 to communicate over one or more networks 106 with a network storage 108. In the illustrated example, a plurality of the electronic devices 102(1), 102(2), 102(3), . . . , 102(N) are associated with the user 104, where N is an integer. For example, the first electronic device 102(1) may be a phone, the second electronic device 102(2) may be a tablet, the third electronic device 102(3) may be a laptop, and the Nth electronic device 102(N) may be a desktop computing device, although any of the various types of electronic devices enumerated above may be used. Further, while a single user 104 is illustrated in this example, in other examples, there may be a large number of users 104, each having one or more respective electronic devices 102.

One or more of the electronic devices 102(1)-102(N) may include an instance of a data management module 110 that executes on the respective electronic device 102(1)-102(N). The data management module 110 may provide data management functionality to the electronic device 102 for controlling which subset 112 of the user data is stored locally on the electronic device 102. Examples of user data that may be maintained on the electronic device include content items 116, applications 118, application data 120, and/or other data 122, as enumerated above.

In addition, one or more of the electronic devices 102(1)-102(N) may include an instance of an event determination module 124 that executes on the respective electronic device 102(1)-102(N). The event determination module 124 may detect, identify, or otherwise determine upcoming events, and may provide information about upcoming events to the data management module 110. In response, the data management module 110 may manage the user data based at least in part on one or more of the upcoming events.

In some examples, the network storage 108 may be provided by a service provider. For instance, various service providers provide commercial cloud storage or other network storage to the public, typically for a monthly or yearly fee based at least in part on the amount of storage space consumed by an individual user. However, implementations herein are not limited to commercial network storage services, and may be extended to other types of network-accessible storage and storage services. As several alternative examples, the network storage 108 may be a network-attached storage (NAS), a server computing device, a desktop computing device, or the like, such as may be maintained by the user 104 or other entity.

In the illustrated example, the network storage 108 includes one or more service computing devices 126 that include a data storage module 128. The service computing device 126 may include or may be in communication with one or more storage devices 130, such as by direct connection, or via the one or more networks 106. The one or more networks 106 can include any suitable network, including a wide area network, such as the Internet; a local area network, such an intranet; a wireless network, such as a cellular network, a local wireless network, such as Wi-Fi and/or close-range wireless communications, such as BLUETOOTH®; a wired network; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the electronic devices 102 and the service computing device 126 are able to communicate over the one or more networks 106 using wired or wireless connections, and combinations thereof.

In some examples, the data management module 110 and/or the event determination module 124 may be modules of an operating system on the electronic device 102. In other examples, the data management module 110 and/or the event determination module 124 may be modules that are separate from the operating system, such as may be included in one or more applications executable on the electronic device 102. For instance, the data management module 110 may have permission for system-level access to user data stored on the electronic device 102. In addition, while the data management module 110 and the event determination module 124 are illustrated in this example as residing on the electronic device 102, in other examples, at least some of the functionality of these modules may reside on the service computing device 126 or other suitable computing device.

The data storage module 128 on the service computing device 126 may manage the storage of the user data on the storage devices 130, and may control access to the user data. In the case that the network storage 108 is provided by a commercial storage service, the storage devices 130 may be enterprise level storage arrays, such as may be maintained in a storage area network, a NAS cluster, a RAID (redundant array of independent disks) array, a distributed storage node array, or various other types of storage configurations. The storage devices 130 may store a superset 132 of the user data, which may include copies of some or all of the user data, including the user's content items 114, applications 116, application data 120, and/or other data 122. For instance, the subsets 112 of user data on each of the electronic devices 102(1)-102(N) may be automatically synchronized with the superset 132 of user data on the network storage 108. Thus, in some cases, the individual electronic devices 102(1)-102(N) may each store locally different subsets 112 of the user data, while the network storage 108 may store a complete or substantially complete superset 132 of the user data.

As mentioned above, the event determination module 124 may determine that there may be an upcoming event for which it would be useful for the user 104 to have access to a particular subset 112 of the user data on the electronic device 102. For instance, suppose that the user's calendar indicates that the user will be taking a flight in the near future. The event determination module 124 may pass this event information to the data management module 110. In response, the data management module 110 may determine a subset of the user data that is recommended for the user 104 to have access to during the upcoming flight. For instance, as mentioned above, the data management module 110 may rank various pieces of the user data based on the category of the event, user preferences, past data usage patterns of the user, recentness of the data, and various other considerations.

In some cases, the data management module 110 may present user data management information 134 in one or more graphic user interfaces (GUIs) 136 presented on a display 138 associated with the electronic device 102. For instance, one of the GUIs 136 may present a first listing of user data that is recommended to be loaded onto the electronic device 102 prior to the event, while another of the GUIs may present a second listing of user data that is recommended to be offloaded from the electronic device 102 to make room for the user data that will be downloaded. The user may interact with the GUIs 138 to select the user data to be downloaded and/or offloaded. Alternatively, in some examples, such as based on data management settings previously selected or otherwise approved by the user 104, the data management module 110 may automatically offload a one or more pieces of the user data and may automatically download one or more other pieces of the user data in response to the detection of the upcoming event. In either case, a first portion of the user data may be sent to the network storage 108 as offloaded user data 140, and a second portion of the user data may be received from the network storage 108 as the downloaded user data 142.

Additionally, in some examples in which the first portion of user data on the electronic device 102 that is recommended for offloading has already been previously synchronized with the superset of user data 132 at the network storage location 108, it is not necessary for any user data to actually be sent as the offloaded user data 140. Instead, because a copy of the offloaded user data 140 is already stored at the network storage 108, the offloaded user data 140 on the electronic device 102 may be merely marked for deletion from the local storage of the electronic device 102 and overwritten in due course.

Figure 2:
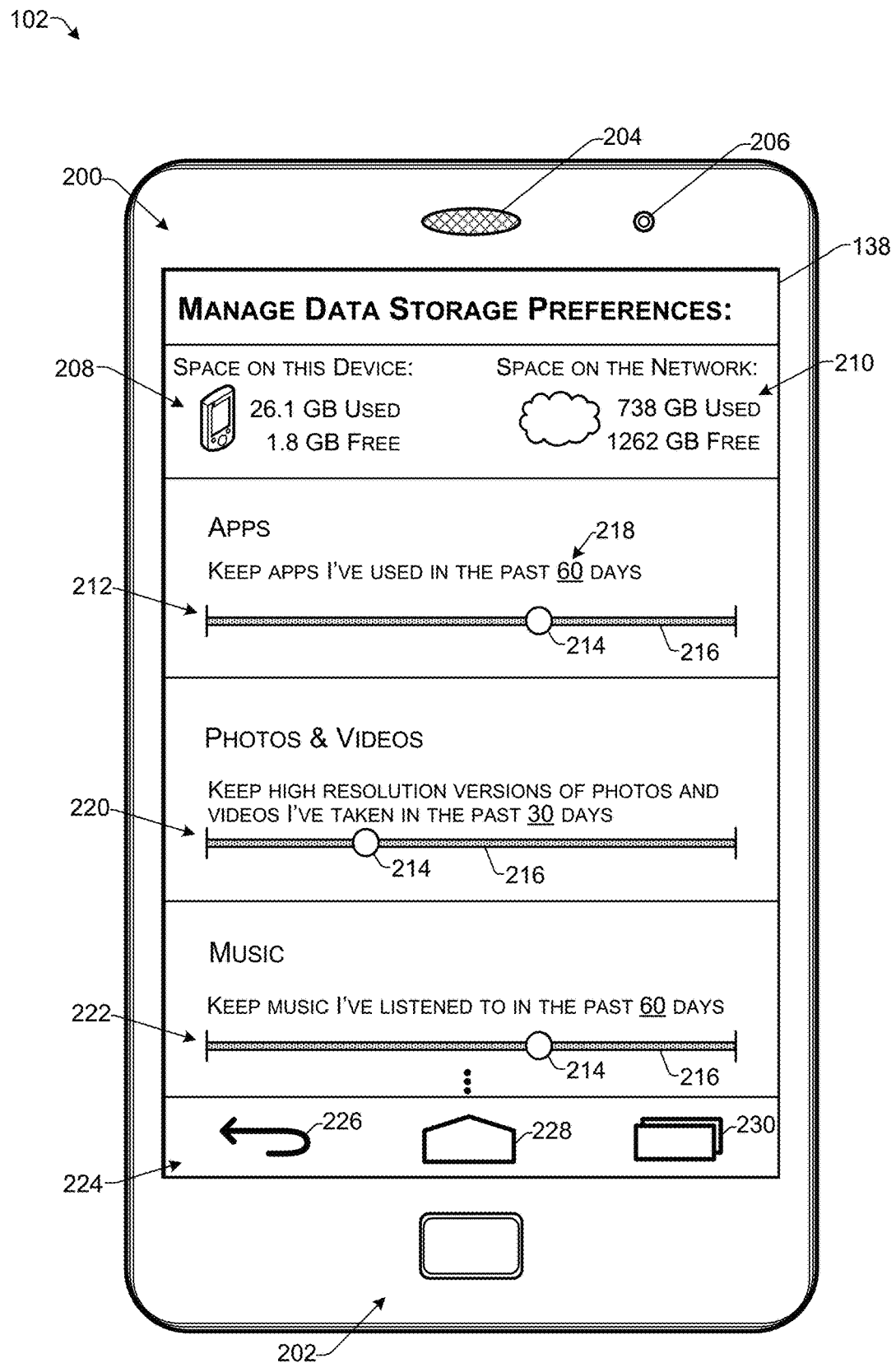
FIG. 2 illustrates an example GUI for managing data storage preferences according to some implementations.

FIG. 2 illustrates an enlarged example view of the electronic device 102 with an example GUI 200 presented on the display 138 according to some implementations. In the example of FIG. 2, the electronic device 102 may include one or more electro-mechanical controls 202, a speaker 204 and a camera 206, as well as various other components and features as discussed additionally below with respect to FIG. 15.

The GUI 200 may be presented to enable the user to manage user preferences for specifying when certain user data is offloaded from the electronic device 102. For instance, as indicated at 208, the GUI 200 may present an indication of the amount of used and available storage space on the electronic device 102. Further, as indicated at 210, the GUI 200 may present the used and available storage space at the network storage. Further, the GUI 200 may include one or more virtual controls for enabling the user to specify how long particular categories of user data are to be retained in the local storage of the electronic device 102. Thus, a virtual control 212, in the form of a slider in this example, may be used to specify how long applications and associated application data are retained in the local storage after the last time the application is used. As a slider button 214 is moved along a slider scale 216 by a user input, the number of days 218 that an application and associated application data are retained in the local storage is changed. In the illustrated example, the user has elected to retain an application and associated application data for 60 days following the last time the application is used. Following the expiration of 60 days without use, an application and associated application data still may be maintained at the network storage location, but may be overwritten, removed, or otherwise offloaded from the local storage of the electronic device 102.

Similarly, a virtual control 220 may be presented to enable the user to specify how long high-resolution versions of images, such as photos and videos, are maintained in the local storage of the electronic device 102. For example, after the expiration of the specified period of time, which in this example is 30 days, the photos and videos may be downsampled to lower resolution versions, while the higher resolution original versions are maintained at the network storage. The photos and videos may be synchronized with the network storage shortly after being taken, and thus it may not be necessary for the electronic device to be in communication with the network storage to downsample the photos and/or videos. Additionally, in other examples, lower resolution versions of the photos and/or videos might not be maintained in the local storage of the electronic device 102.

In addition, a virtual control 222 may be presented to enable the user to specify how long music files are maintained in the local storage of the electronic device 102. For example, after the expiration of the specified period of time, which in this example is 60 days from when the music file was last played, the particular music file may be offloaded from the local storage of the electronic device 102. Furthermore, the user may be able to scroll the GUI 200 to specify storage preferences for additional types of user data. In addition, the GUI 200 may include one or more operating system virtual controls 224, such as a back control 226, a home control 228, and a menu control 230, which may be used for various navigation functions.

Figure 3:
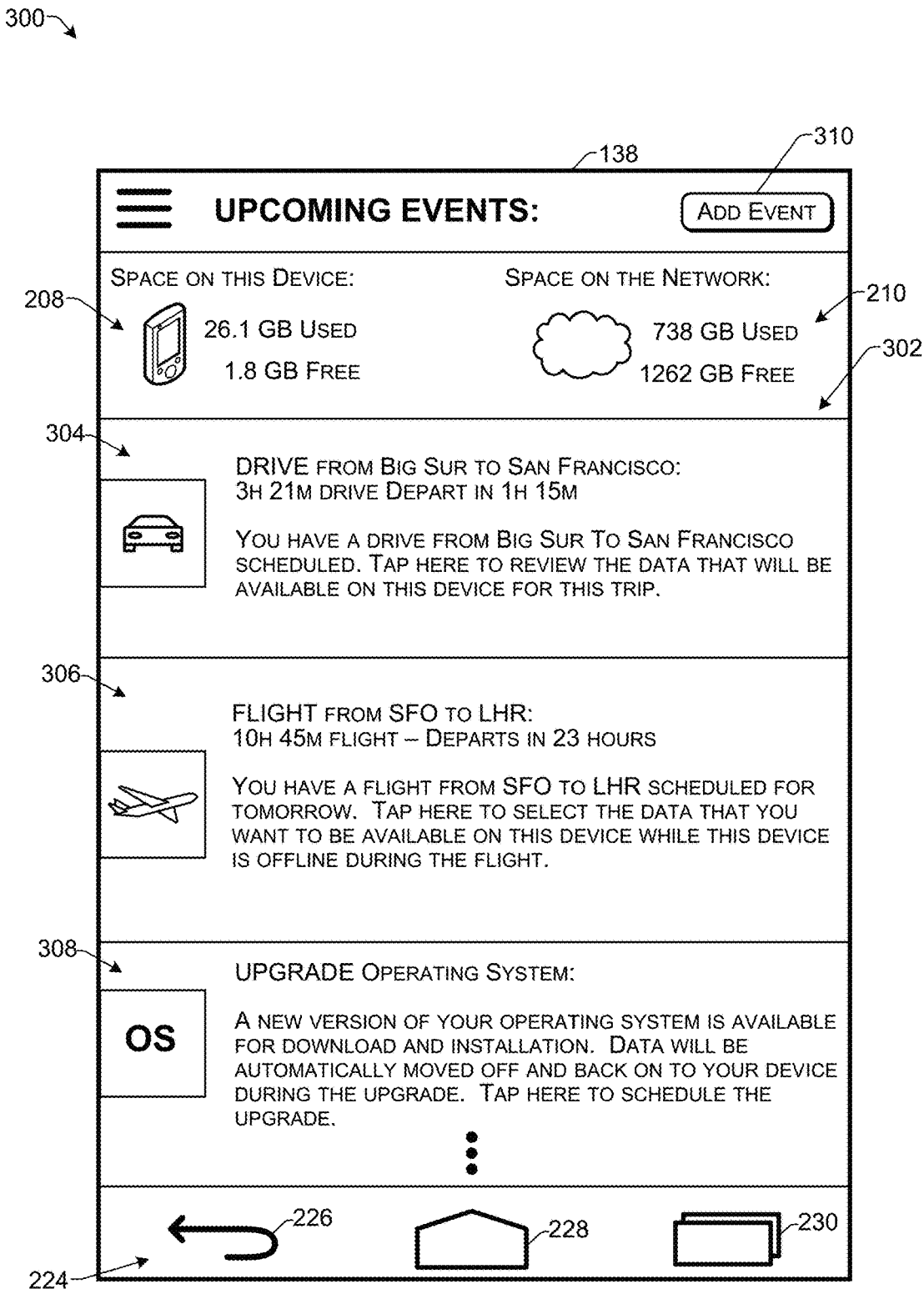
FIG. 3 illustrates an example GUI for presenting prospective events according to some implementations.

FIG. 3 illustrates an example GUI 300 that may be presented on the display 138 of the electronic device according to some implementations. The GUI 300 may present event information as a listing 302 of upcoming events corresponding to one or more future events determined by the event determination module 124. The listing 302 of event information may include a description of each anticipated event, and may provide the user with an opportunity to review and/or select the subset of user data that will be available on the local storage of the electronic device during the event.

As one example, as indicated at 304, suppose that the user is planning to drive from Big Sur, Calif., to San Francisco in the near future, and has already selected and/or approved the user data that the user would like to have available locally on the electronic device during the drive. For instance, the data management module may have previously recommended user data for the drive and the data desired by the user for local access on the electronic device may have already been downloaded onto the electronic device earlier, such as during the previous night while the user was sleeping or during another suitable time. Accordingly, the GUI 300 may present at 304 a reminder about the drive, and may provide the user with the option to review the user data that will be available locally on the electronic device during the drive. In some examples, by tapping on or otherwise selecting the area indicated at 304, the user may select additional data to be loaded onto the electronic device or offloaded from the electronic device.

As another example, as indicated at 306, suppose that the user has a flight scheduled from San Francisco Airport to London Heathrow Airport the following day. For instance, the event determination module may have detected the scheduled flight from the user's calendar residing on the electronic device, or through various other techniques. Accordingly, the user may tap on or otherwise select the area indicated at 306, and the user may review and/or approve data selected by the data management module to be stored locally on the electronic device for the upcoming flight. Additional details of reviewing, selecting, and/or approving user data to be stored locally for the flight are discussed below with respect to FIGS. 4-9.

As another example, as indicated at 308, suppose that an upgrade to the operating system of the electronic device has become available for download and installation on the electronic device. The data management module may automatically determine one or more portions of user data to move off the electronic device to make available sufficient storage space for the operating system download and installation. Following the installation of the operating system upgrade, the data management module may then automatically move the offloaded data back on to the electronic device, or may proceed with down loading additional information. Accordingly, the user may tap on or otherwise select the area of the GUI indicated at 308 to schedule the upgrade and/or review the data that the data management module proposes to offload and download during the operating system upgrade.

Further, the user may scroll through the listing 302 of upcoming events to view additional upcoming events detected by the event determination module. In some examples, the user may select an "add event" virtual control 310 to enable the user to manually add an event to the list of upcoming events. In such a case, the data management module may respond to the user added event in a manner similar to the events detected by the event determination module, and may determine a suitable subset of user data to be stored locally on the electronic device for the user added event.

Figure 4:
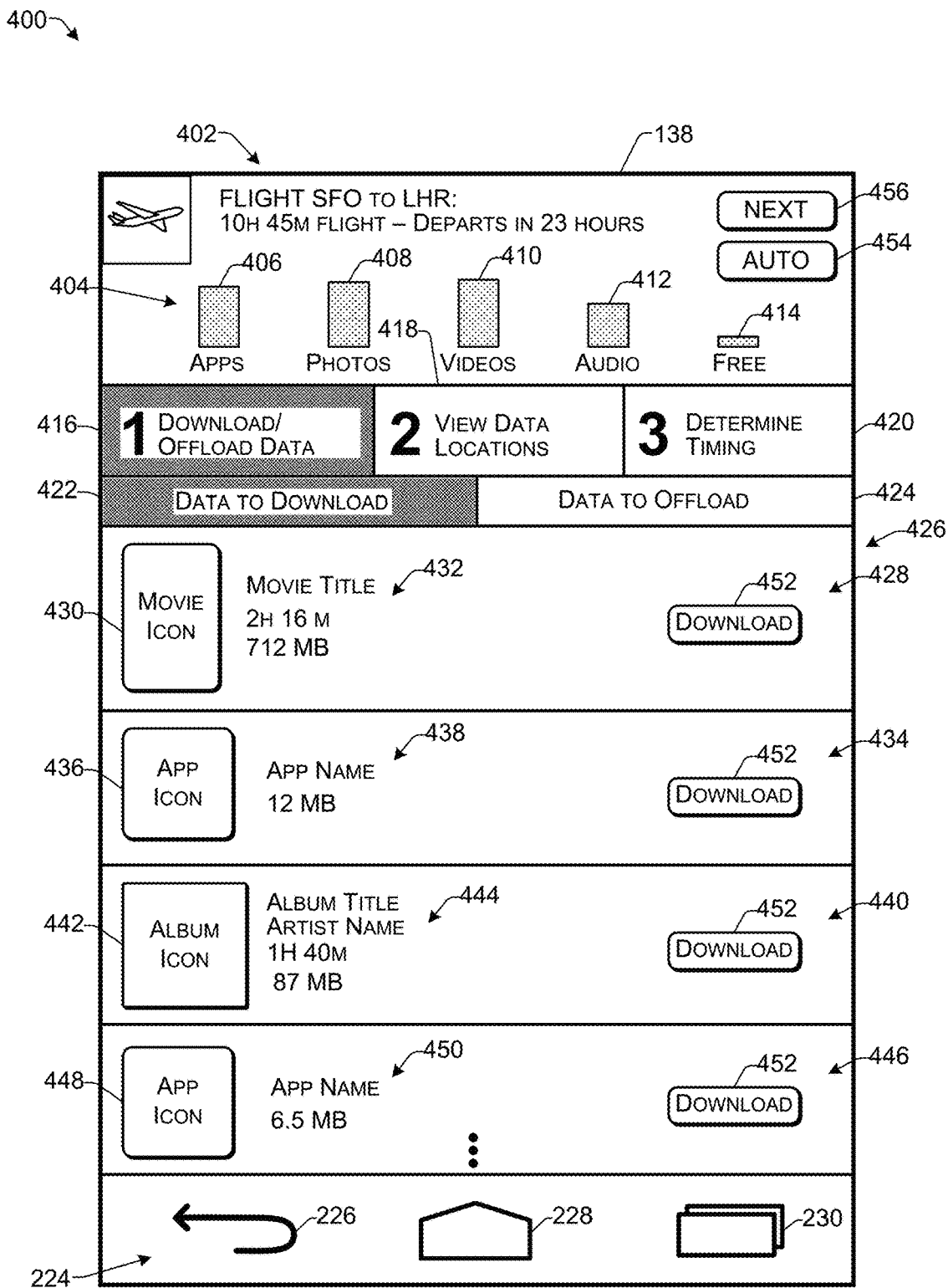
FIG. 4 illustrates an example GUI for presenting user data that is recommended for downloading onto the electronic device according to some implementations.

FIG. 4 illustrates an example GUI 400 that may be presented on the display 138 of the electronic device according to some implementations. In this example, the GUI 400 includes an indication that the flight event 402 for which the user data is being managed is a flight from San Francisco to Heathrow. Thus, in some cases, the category for the event may be a long airplane flight during which the electronic device may be placed in airplane mode. The GUI 400 further includes a breakdown 404 of the current distribution of different types of user data on the electronic device. The breakdown 400 may include the relative amount of storage space currently occupied by the different data types, such as applications 406, photographs 408, videos 410, audio 412, and the amount of free space 414 available.

In addition, the GUI 400 may include a plurality of virtual controls including a first virtual control 416 that may be selected by the user to view data that will be downloaded and or offloaded for the event, a second virtual control 418 that may enable the user to view the current location of various pieces of user data, and a third virtual control 420 that may enable the user to view and or modify the timing of any data transfers to or from the electronic device. Further, in this example, suppose the user has selected the first virtual control 416, which may be highlighted or otherwise visually distinguished from the other virtual controls 418 and 420, as a result. In this case, the user may be presented with additional virtual controls including a virtual control 422 that is selectable to enable the user to view data to be downloaded onto the electronic device for the selected flight event 402, and a virtual control 424 that is selectable to enable the user to view data that will be offloaded from the electronic device for the selected event 402.

In the illustrated example, suppose that the user has selected the virtual control 422 to view data that is recommended to be downloaded to the electronic device for the selected event 402. Accordingly, a listing 426 of recommended data may be presented in the GUI 400. In some examples, the listing may be in a ranked order determined by the data management module, such as in an order in which data having the highest priority ranking for being downloaded to the electronic device is listed first in the listing 426, with the remaining pieces of data in the listing 426 having sequentially lower priority rankings. In some cases, the ranking may be based at least in part on a likelihood that the user will use the particular piece of data during the event, e.g., during the flight.

In this example, the highest ranked piece of user data is a movie content item 428, which is presented in the listing 426 with a movie icon 430 and other movie information 432, such as movie title, movie playback time, and a size of the movie file in storage. For instance, the movie 428 may be highly ranked for being downloaded based on various factors determined by the data management module, such as the movie being recently purchased by the user, but not yet viewed, and/or past user data usage history indicating that the user usually watches one or more movies during a flight, and/or various other factors, as discussed additionally below with respect to FIG. 11.

In this example, a next highest piece of data recommended for downloading onto the electronic device may be an application 434, which may be presented in the listing 426 with an application icon 436 and other application identifying information 438, including application name, and file size of the application and associated application data. For example, the application 434 may be an application that is pertinent to the current event 402 but which otherwise is not often used. As one example, the application 436 may be an application of the airline on which the user is flying. Additional factors considered when determining priorities for user data to be downloaded to the electronic device are discussed below with respect to FIG. 11.

A third highest ranked piece of data recommended for downloading onto the user device in this example is an album of music 440 that the user recently purchased, which may be identified by an album icon 442, and additional album information 444 such as album title, album artist name, playback time, and file size. Furthermore, a fourth highest ranked piece of data recommended for downloading onto the user device in this example is an application 446, which may be identified by an application icon 448 and other application identifying information 450, such as an application name and application size. Furthermore, the user may scroll the listing 426 to view additional pieces of user data recommended for downloading onto the electronic device for use during the selected event 402.

In some examples, a "download" virtual control 452 may be associated with each piece of data presented in the listing 426. Accordingly, the user may tap or otherwise select each download virtual control 452 to schedule the associated piece of data for download to the electronic device. Thus, as the user scrolls through the list 426, the user may tap each associated virtual control 452 adjacent to desired pieces of data that the user would like to have available during the flight 402. Alternatively, in some examples, an "auto" download virtual control 454 may be provided in the GUI 400, which the user may select to have the data management module automatically download all of the recommended pieces of data in the listing 426.

As still another alternative, rather than having the auto virtual control 454, the user may have previously authorized the data management module to automatically download recommended data to the user device. In such a case, the download virtual controls 452 may be "do not download" virtual controls, and thus the user may select particular pieces of data to be excluded from being automatically downloaded to the user device for the flight event 402. Additionally, the GUI 400 may include a "next" virtual control 456 which the user may select to view user data recommended to downloaded for a next event in the list of events, such as that discussed above with respect to FIG. 3.

Figure 5:
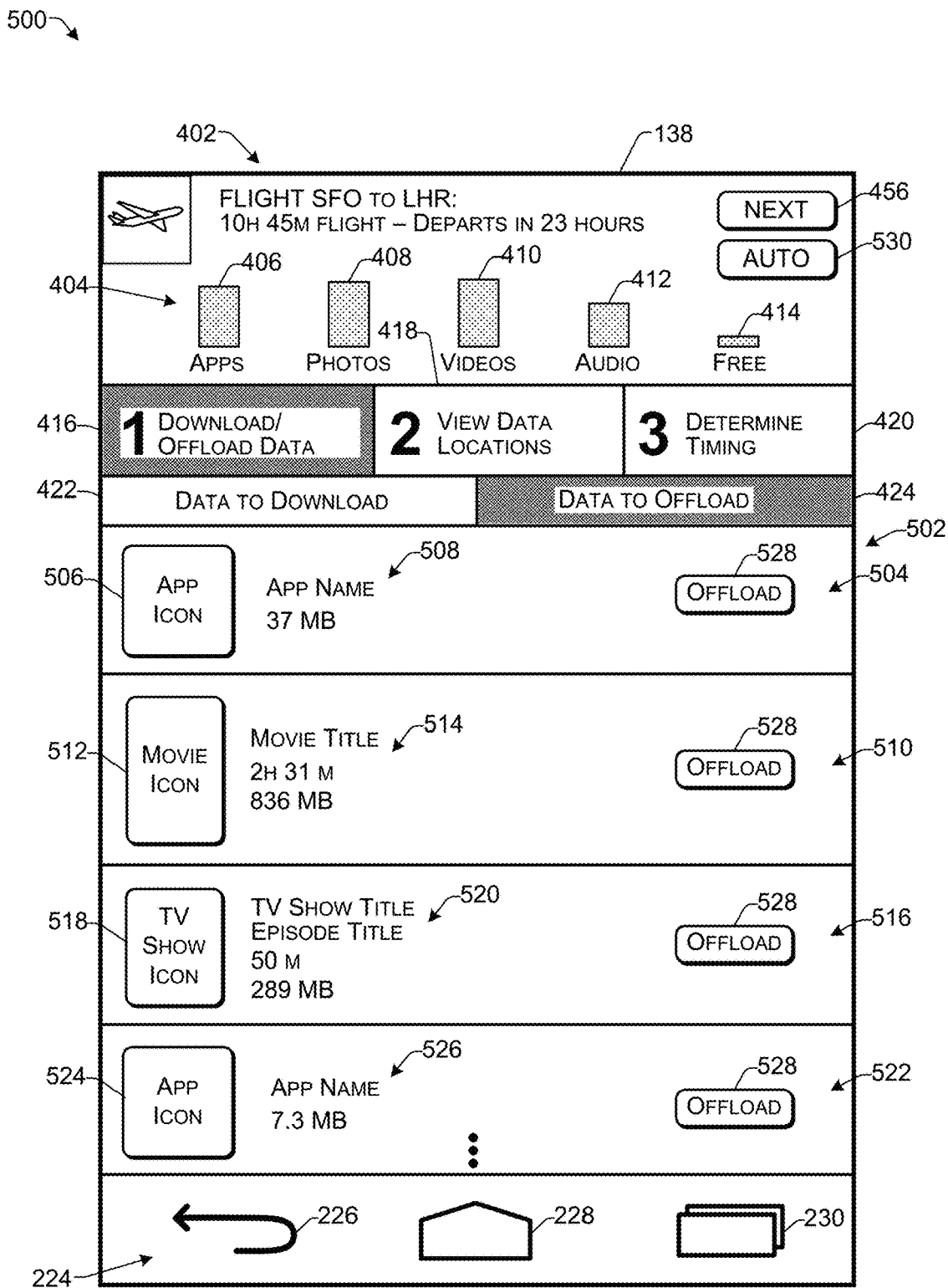
FIG. 5 illustrates an example GUI for presenting user data recommended for offloading from the electronic device according to some implementations.

FIG. 5 illustrates an example GUI 500 that may be presented on the display 138 of the electronic device according to some implementations. In this example, suppose that the user has selected the virtual control 424 to view data that will be offloaded from the electronic device for the flight event 402 to make room for the user data that will be downloaded to the electronic device. Accordingly, the GUI 500 may present a listing 502 of pieces of user data that are recommended to be offloaded from the user device for the event 402. In some examples, the user data recommended to be offloaded may be listed according to a priority ranking, with higher ranked pieces of user data being listed higher in the listing 502. For instance, the ranking may be based at least in part on a likelihood that that use will not use the user data during the event.

In the illustrated example, a highest ranked piece of data recommended for offloading from the user device to the network storage is an application 504, which may be identified by an application icon 506 and other application information 508, such as an application name and size of the application and application data. As one example, the application 504 may be an application that the user's historical usage shows that the user has never used during a flight. For instance, the application may be related to a business or other entity that is local to San Francisco and which would be of little use to the user when in London.

Additional pieces of data that are recommended for offloading from the user device for the flight event 402 may include a movie 510 identified by a movie icon 512 and additional movie information 514 such as a movie title, run time, and file size; a television show 516 identified by a television show icon 518, and additional show information 520 such as television show title, episode title, run time, and file size; and an application 522 identified by an application icon 524 and additional application information 526 such as an application name and size of the application and associated data. For instance, the movie 510 and TV show 516 may be content items that the user has already completed viewing in their entirety and for which there is no indication that the viewer would desire to view again. Similarly, the application 522 may be an application that the user has never used during a flight. Furthermore, the user may scroll through the listing 502 to view additional pieces of information recommended for offloading from the user device.

In some examples, and offload virtual control 528 may be associated with each piece of user data recommended for offloading from the user device. Accordingly, as the user scrolls through the listing 502 the user may tap individual virtual controls to approve the offload of that particular piece of user data. Additionally, the GUI 500 may include an "auto" offload virtual control 530, which the user may select to have the data management model module automatically offload all of the data recommended in the listing 502 as necessary to make sufficient storage space on the electronic device for the data that will be downloaded to the electronic device for the flight event 402. Alternatively, the user may have previously approved the data management module to automatically offload recommended data, in which case the offload virtual controls 528 may be "do not offload" virtual controls, that the user may use to select particular pieces of user data that the user does not want automatically offloaded from the electronic device for the flight event 402. Furthermore, the user may select the next button 456 to view data that will be offloaded for the next event in the listing of upcoming events.

Figure 6:
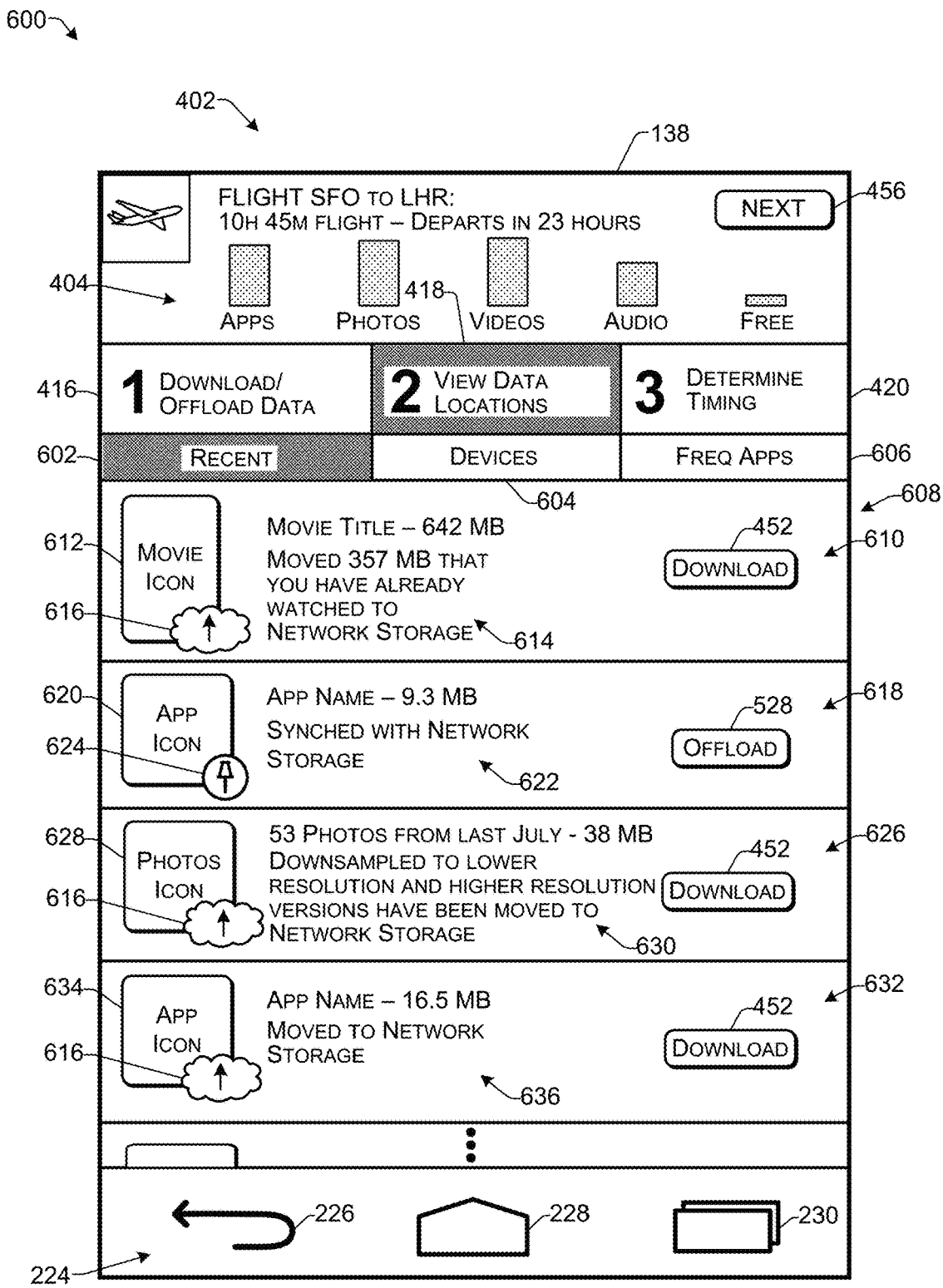
FIG. 6 illustrates an example GUI for presenting user data that has been recently loaded onto the electronic device or offloaded from the electronic device according to some implementations.

FIG. 6 illustrates an example GUI 600 that may be presented on the display 138 of the electronic device according to some implementations. In this example, suppose that the user has selected the virtual control 418 to view locations of the user data, as indicated by the virtual control 418 being highlighted or otherwise visually distinguished from the other virtual controls 416 and 420. In response, the GUI 600 may present additional virtual controls such as: a virtual control 602 that is selectable to enable the user to view recently moved data; a virtual control 604 to enable the user to view data on particular devices associated with the user; and a virtual control 606 to enable the user to view a list of frequently used applications.

In this example, suppose the user has selected the virtual control 602 to view recently moved user data. In response, the GUI 600 may present a listing 608 of pieces of user data that have been recently downloaded, offloaded, synchronized with the network storage, or the like. For instance, the listing 602 may be presented according to a most recently moved order. In the illustrated example, a first piece of data in the listing is a movie 610, which may be identified by a movie icon 612 and additional movie information 614, such as movie title and file size. Furthermore, the additional information 614 may indicate that some or all of the movie has been offloaded to network storage. For example, suppose that the user already watched the first half of the movie. Accordingly, at least the first half of the movie 610 may be stored in the network storage, and the second half of the movie 610 may still be maintained in local storage on the electronic device. A cloud icon 616 may be associated with the movie icon 612 to indicate visually to the user that the movie has been offloaded at least in part to the network storage. Furthermore, should the user desire to watch the first half of the movie again, the user may select the associated download virtual control 452 to have the first half the movie downloaded back onto the electronic device.

A next highest ranked data item in the listing 608 in this example is an application 618 identified by an application icon 620 and additional application information 622, including application name and file size. In this example, the application information 622 indicates that the application was recently synced with the network storage and that the application is pinned to the electronic device as indicated by the pin icon 624 associated with the application icon 620. For instance, a piece of user data that is pinned may be a piece of data that the user has indicated that the user would like to retain on the electronic device and is therefore not subject to automatic offloading from the electronic device by the data management module. Should the user wish to unpin or otherwise offload the application 618 the user may select the offload virtual control 528 associated with the particular application 618.

A next highest ranked data item in the listing 608 in this example is a plurality of photographs 626 identified by a photo icon 628 and additional photo information 630 including date information and file size. In this example, the photo information 630 indicates that these 53 photographs have been down sampled from higher resolution to a lower resolution, and the higher-resolution versions of the photographs have been offloaded to the network storage. For example, the photographs 626 may have been offloaded to the network storage based on the user preferences for offloading photographed after a set period of time, such as discussed above with respect to FIG. 2. In some cases, the photographs 626 may have already been stored on the network storage shortly after the photographs were taken and, thus, the offloading of these photographs 626 merely indicates that the high-resolution versions of the photographs are no longer available on the local storage. Should the user desire to have the high-resolution versions of the photos available on the local storage, the user may select the download virtual control 452 associated with the photographs 626.

A next highest ranked data item in the listing 608 in this example is an application 632 identified by an application icon 634 and additional application information 636 including an application name and file size. In this example, the application information 636 indicates that the application 632 was offloaded to the network storage and is therefore no longer accessible on the local storage. For instance, a predetermined period of time may have passed since the user last opened the application 632. Based on the user preferences, as discussed above with respect to FIG. 2, the data management module may have moved the application 632 to the network storage. In some cases, the application 632 may already be stored on the network storage, and may have been regularly synchronized with any new application data. Thus, offloading the application 632 from the electronic device is performed by marking or otherwise indicating the application 632 as deleted and allowing the local storage location of the application 632 to be overwritten with new user data. If the user desires to have the application 632 locally available, the user may select the download virtual control 452 associated with the application 632.

Figure 7:
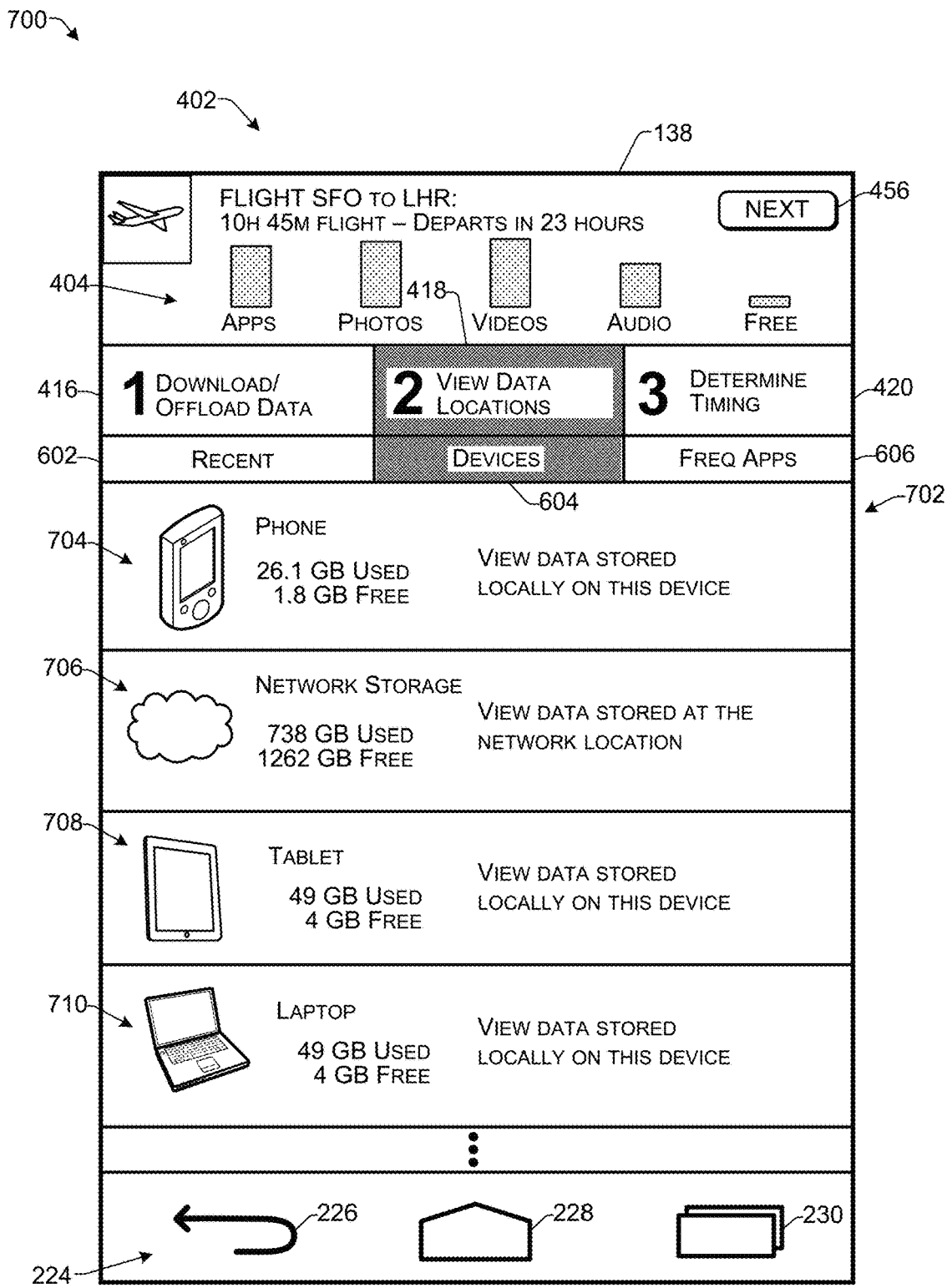
FIG. 7 illustrates an example GUI for enabling a user to view data stored on the current electronic device, at the network storage, or on other electronic devices associated with the user according to some implementations.

FIG. 7 illustrates an example GUI 700 that may be presented on the display 138 of the electronic device according to some implementations. In this example, suppose that the user has selected the virtual control 604 to view the data located on a plurality of electronic devices associated with the user. The GUI 700 may present a listing 702 of the electronic devices associated with the user. In this example, suppose that the electronic device that the user is currently using is a phone 704, which is listed first in the listing 702. The listing 702 in this example further includes the network storage 706, a tablet 708, and a laptop 710. Further, the user may scroll the listing 702 to view data stored on additional electronic devices associated with the user.

For each device 704-710 presented in the listing 702, the user may tap on or otherwise select the listed device to view the data stored locally on that device. As one example, the user may view the data stored locally on the tablet 708 on the display 138 of the current electronic device, which in this example is the phone 704. Thus, the user may select the tablet 708 and may be presented with a listing of the user data currently stored on the tablet 708. Furthermore, in some examples, the user may select the tablet 708 in the context of the flight event 402 and may be presented with recommendations for user data to be downloaded to the tablet 708 and/or offloaded from the tablet 708 for the flight event 402, in GUIs similar to those discussed above with respect to FIGS. 4 and 5. For instance, if the user typically travels with the tablet 708 in addition to the phone 704, the data recommendations for the flight event 402 may take into consideration user data to be stored locally on the tablet 708 during the event 402, in addition to data to be stored locally on the phone 704. Furthermore, the data recommendations may take into consideration the form factor of each electronic device that the user will have access to during the flight event 402, storage capacity, the user's typical use of each device in the past, such as on past flights, and various other factors, when determining which pieces of user data to recommend for download to the phone 704 and which pieces of user data to recommend for download to the tablet 708.

Figure 8:
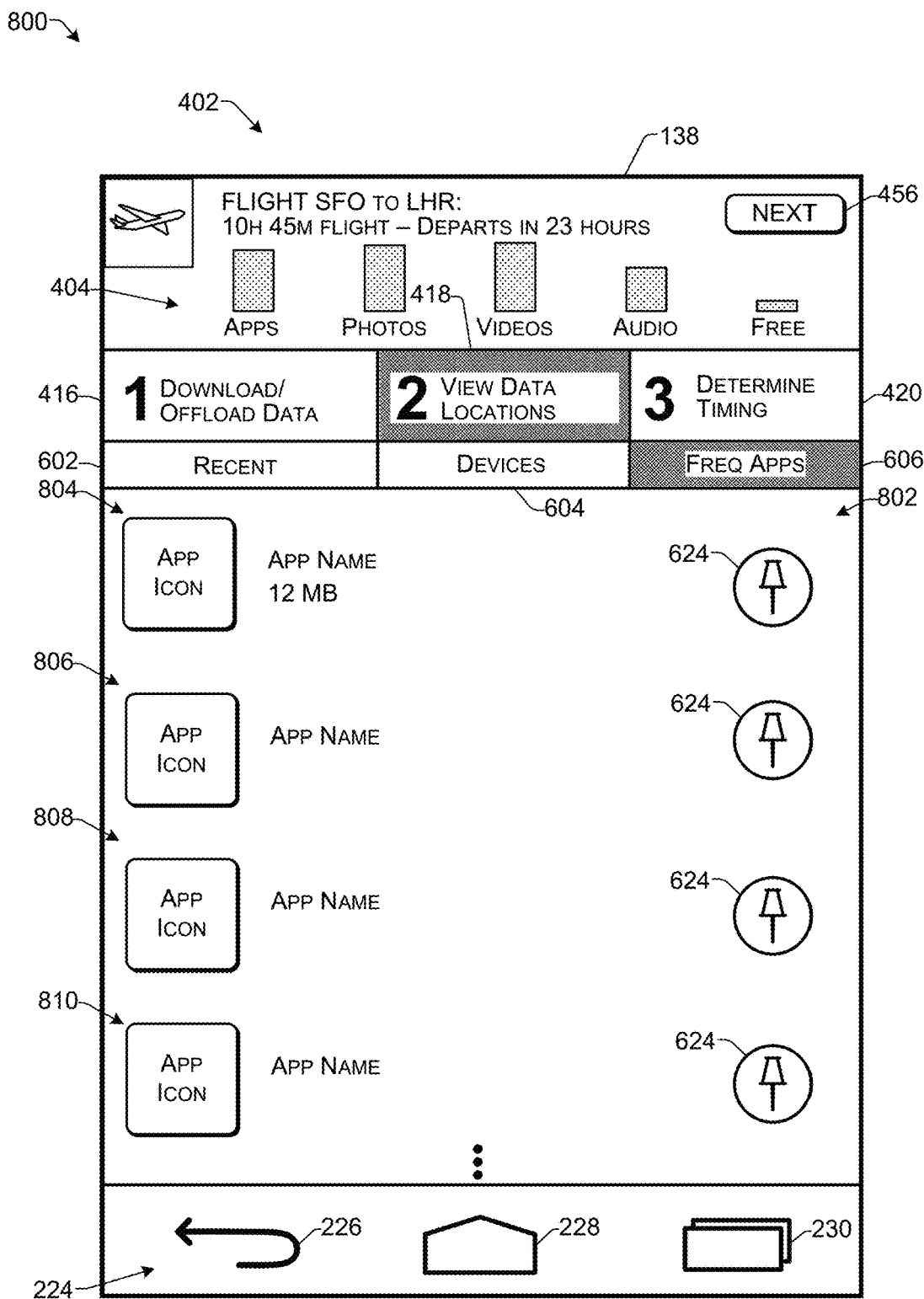
FIG. 8 illustrates an example GUI for presenting a listing of frequently used applications according to some implementations.

FIG. 8 illustrates an example GUI 800 that may be presented on the display 138 of the electronic device according to some implementations. In this example, suppose that the user has selected the virtual control 606 to view the frequently used applications stored on the electronic device. The GUI 800 may present a listing 802 of frequently used applications, which may be ranked according to frequency of use, e.g., with more frequently used applications listed higher than less frequently used applications. Thus, an application 804 may have been used more frequently than applications 806, 808, or 810 in the illustrated listing 802.

In the listing 802, the applications 804-810 each have an associated pin icon 624 adjacent to the application identifying information. As mentioned above, the pin icon 624 may indicate that the associated application will not be automatically removed from the local storage of the electronic device. If desired, the user may select one of the pin icons 624 to unpin a respective application from the electronic device.

Figure 9:
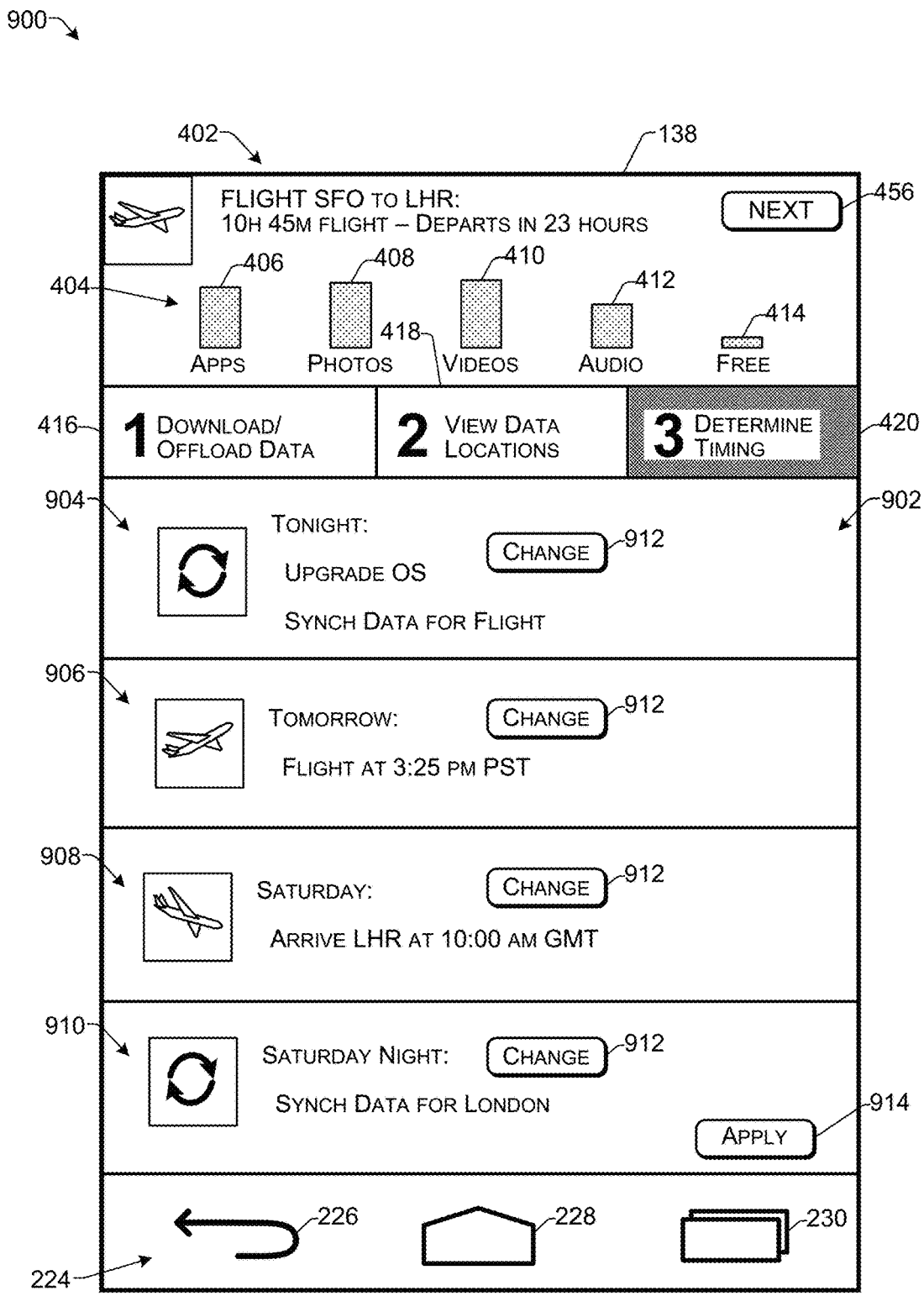
FIG. 9 illustrates an example GUI presenting recommended timing for synchronizing data on the electronic device according to some implementations.

FIG. 9 illustrates an example GUI 900 that may be presented on the display 138 of the electronic device according to some implementations. In this example, suppose that the user has selected the virtual control 420 to determine the timing for the selected user data changes to the electronic device for one or more scheduled events. In response, the GUI 900 may present a listing 902 of scheduled user data changes and other upcoming events of significance. In this example, as indicated at 904, the listing 902 includes two data changes that will take place on the electronic device that night, such as while the user is sleeping. These data changes include an upgrade to the operating system, followed by synchronizing data for the flight event discussed above. For example, the data management module may offload an amount of data from the electronic device to enable download and installation of an upgrade to the operating system of the electronic device. Subsequently, following the upgrade to the operating system, the data management module may download the data recommended for the flight event discussed above. Accordingly, in some examples, the data offloaded from the electronic device to enable the upgrade to the operating system may be the same data that is recommended to be offloaded to make room in the local storage for downloading the user data recommended to be made locally available for the flight event discussed above.

In addition, as indicated at 906, the listing 902 may indicate that the user's flight is scheduled for tomorrow at 3:25 PM, and as indicated at 908, the listing 902 may indicate that the user is scheduled to arrive at London Heathrow Airport at 10:00 AM on Saturday. Furthermore, the as indicated at 910, the listing 902 may indicate that the user's data will be re-synchronized to provide a different subset of user data recommended for use by the user in London, and that the synchronization of this data will take place on Saturday night. In some examples, the user may desire to change the timing of one or more of these listed events and may do so by selecting a "change" virtual control 912 associated with each listed event. For example, the user may desire for the user data recommended for London to be downloaded to the user's electronic device earlier than Saturday night, such as upon landing at London Heathrow Airport. On the other hand, if the user is satisfied with the proposed timing of the data changes, the user may select and "apply" virtual control 914 to proceed with having the data changes applied according to the proposed timing.

Figure 10:
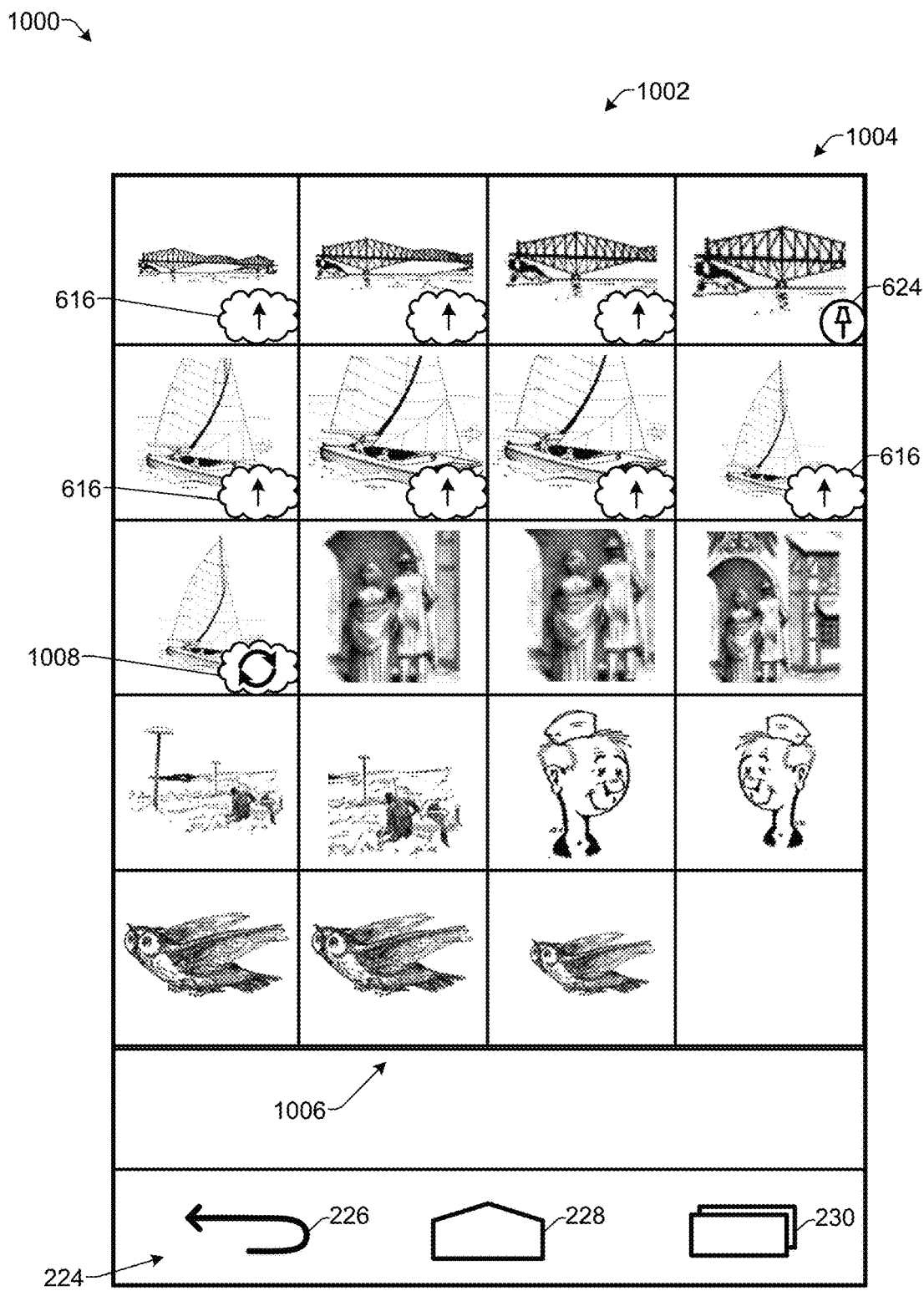
FIG. 10 illustrates an example GUI for showing the status of images, such as photographs and/or videos, maintained on the electronic device according to some implementations.

FIG. 10 illustrates an example GUI 1000 that may be presented on the display 138 of the electronic device according to some implementations. In this example, suppose that the user has navigated to a photo gallery 1002 to view a plurality of images, such as photographs 1004, stored on the electronic device. As discussed previously, in some examples, photographs and/or videos taken by the user might not be removed entirely from the electronic device, but instead are downsampled to a lower resolution, and the higher resolution versions are offloaded to the network storage. Accordingly, the gallery 1002 may indicate which photographs have been downsampled and which photographs have not. As one example, the photographs that have been downsampled may include a cloud icon 616, or other indicator, while the photos that are still at full resolution may be devoid of such an indicator. Furthermore, in some cases the user may pin a full resolution version of a photograph to the electronic device so that the pinned photograph is not downsampled. The pin icon 624 may be presented in the GUI 1000 to indicate a photograph that is pinned to the electronic device.

As one example, suppose that the user will be attending a wedding or other event during which the user might want to take a large number of photos or videos. In anticipation of this event, the data management module may offload a certain amount of user data to make room in the local storage for the large number of new photos and/or videos. Some of the user data that is offloaded may include older photos and/or videos, which may be downsampled to lower resolutions, and the higher resolution versions may be stored on the network storage.

Further, in some cases, the data management module may automatically and dynamically offload some data during an event, such as when a threshold remaining amount of free storage space is reached. For instance, suppose that the user is at the wedding and is taking a large number of photographs, so much so that the user has reached the threshold amount of remaining storage space. When the threshold has been reached, to enable the user to continue to add new photographs 1006 or other data to the local storage on the electronic device, the data management module may begin to downsample additional older photographs and/or videos stored on the local storage of the electronic device. As indicated at 1008, a synch icon may be presented in association with a photo or video that is being downsampled and/or offloaded from the local storage. Typically, full resolution versions of older photographs and videos will have already been stored at the network storage shortly after being taken, and therefore it is not necessary for the electronic device to be in communication with a network to dynamically downsample and offload these older photographs and videos.

Additionally, if enough space is still not made available by downsampling the older photos and videos, and if the electronic device is able to communicate with the network storage, the electronic device may offload user data based on a priority that is determined at least in part on current and/or predicted usage of the electronic device in the near term, i.e., during the event. For instance, if the device is in communication with the network storage, the device may downsample and offload high resolution versions of new photos and videos while the user continues to take additional new photos or videos. Additionally, or alternatively, in response to the threshold being reached, the data management module may select other data to be offloaded from the local storage using the priorities described herein. Alternatively, if the electronic device is offline, in addition to downsampling photos or videos that have already been stored to the network storage, as discussed above, the data management module may overwrite other user data that is already stored on the network storage to enable the user to continue to take pictures, videos, or the like. The determination regarding which user data to overwrite may be based at least in part on the data rankings determined for the current event and event category.

Figure 11:
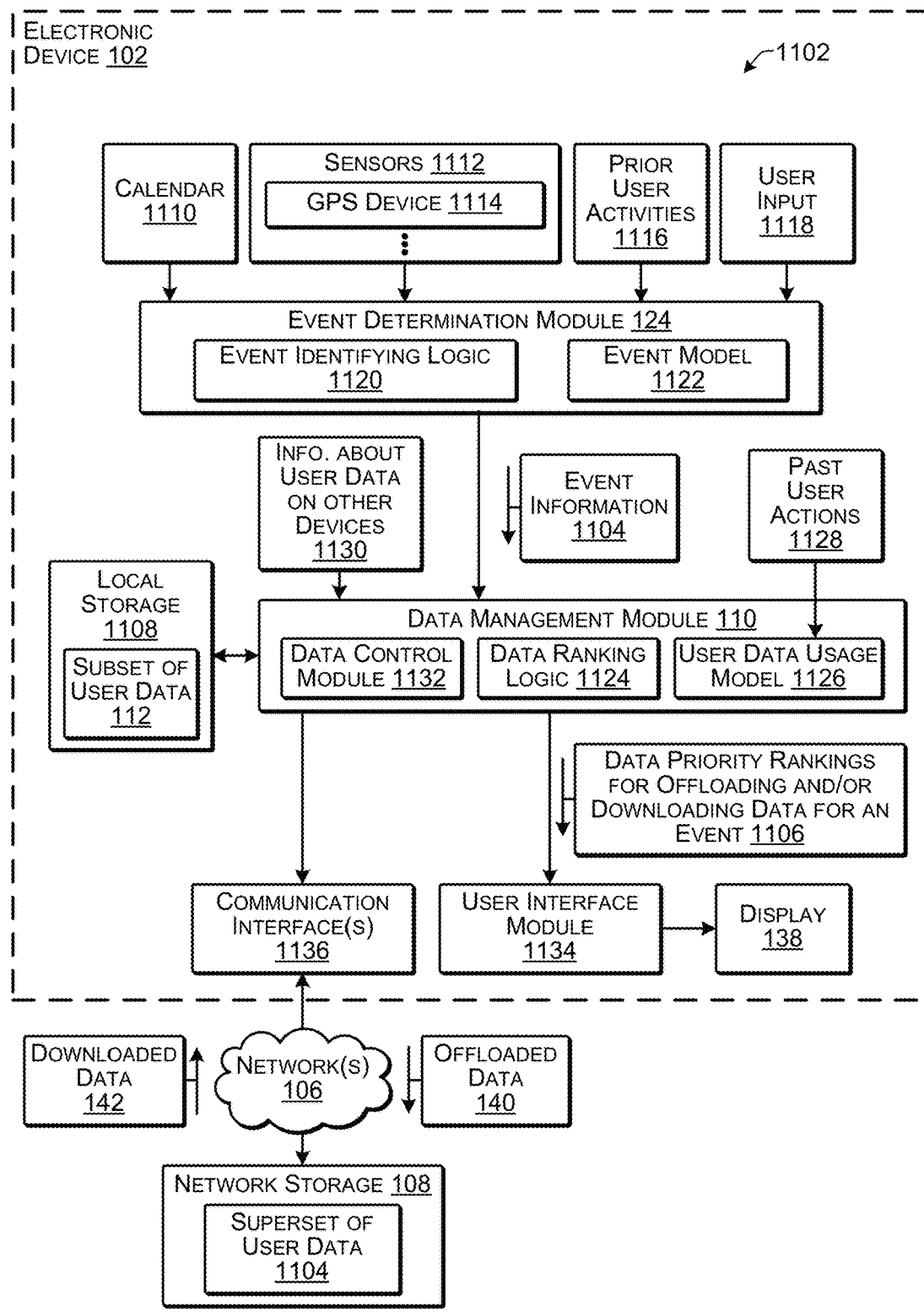
FIG. 11 is a conceptual block diagram illustrating determination of upcoming events and determination of data to be downloaded to the electronic device and/or offloaded from the electronic device according to some implementations.

FIG. 11 is a conceptual diagram 1100 illustrating an example of determining an event and managing user data for the event according to some implementations. In the example of FIG. 11, the event determination module 124 may receive one or more inputs 1102 to use for detecting, identifying, or otherwise determining that an event will take place. In response to determining that an event will take place, the event determination module 124 may provide event information 1104 to the data management module 110. Based at least in part on the event information 1104, the data management module 110 may determine data priority rankings 1106 for offloading and/or downloading data for the prospective event.

As mentioned above, in some examples, an event may include any situation in which the electronic device 102 will be unable to communicate (or unable to communicate reliably) with the network storage 108. Accordingly, during these types of events, the user data accessible on the electronic device 102 may be limited to the subset of user data 112 stored in a local storage 1108. As one example, the electronic device 102 may determine that the electronic device 102 is likely to be out of communication with the one or more networks 106 in the near future, such as during a flight, during travel outside network coverage, during travel to a location where network connection may be unreliable, during an expected or possible network outage, or the like.

Additionally, the determination of a prospective event does not necessarily indicate that the electronic device 102 will be out of communication with the one or more networks 106. Various other types of events may cause the data management module 110 to move substantial amounts of user data to or from the local storage 1108, thereby changing the subset of user data 112 maintained on the electronic device 102. One example of such an event may include the user participating in an activity during which substantial amounts of new data will be added to the local storage over a short period of time, such as when the user is using the electronic device to take a large number of pictures or video. Another example of such an event may include the user participating in an activity that may use certain user data that is not normally present on the electronic device, such as when the user is performing as a DJ as in the example discussed above. Still another example of such an event may include offloading user data from the electronic device to enable installation of a new version of an operating system on the electronic device.

The event determination module may receive various inputs 1102 that can be used for determining upcoming events. As one example, the inputs 1102 may include calendar information from the user's calendar 1110. For instance, the event determination module 124 may periodically access the user's calendar to determine whether any appointments or other scheduled activities may indicate an upcoming event. For instance, if the user has a flight scheduled on the calendar, the event determination module 124 may determine this to be an event, and may forward event information 1104 related to the flight to the data management module 110. In some examples, the event information 1104 may include an event category for the event. For example, different types of events may be categorized into different event categories that may each have different user data usage patterns. Further, in other examples, the data management module may determine an event category for a particular event, while in still other examples event categories might not be used.

As another example, the event determination module 124 may receive inputs from one or more sensors 1112 on the electronic device such as a GPS (Global Positioning System) device 1114, or other sensor that may indicate a geographic location of the electronic device 102 or an activity of the user. For instance, if the sensors 1112 indicate that the user is currently located 300 miles from the user's home location this may indicate that the user will be traveling between the current location and the home location at some point, and the event determination module may further determine whether network coverage is available and reliable between the two locations.

As another example, prior user activities 1116 may also indicate the likelihood of an upcoming event. For instance, if the user has worked as a DJ every Saturday night for the past month, then it is likely that the user will also be performing this job on the next Saturday night. Furthermore, the inputs 1102 may include a direct user input 1118 for indicating an event. For example, the user may expressly schedule events by providing event information 1104 directly to the electronic device 102, such as via the GUI 300 discussed above with respect to FIG. 3, or through other suitable interfaces.

The event determination module 124 may include event identifying logic 1120 that may receive the inputs 1102 and determine one or more upcoming events based on the inputs 1102. In some cases, the event identifying logic 1120 may include, or may access, an event model 1122 that may be used to identify events based on the inputs 1102. As one example, the event model 1122 may be a statistical model that is initially trained using a set of training data. For instance, the training data may be obtained by identifying various different types of events for a plurality of users. The trained model may be checked for accuracy and then used for identifying events for a particular user based on the inputs 1102. The statistical model may be periodically updated and re-trained based on new training data and/or feedback from the user to keep the model up to date.

Examples of suitable statistical models that may be incorporated into the event model 1122 may include regression models, such as linear regression models, and stochastic models, such as Markov models, hidden Markov models, and so forth. Additionally, or alternatively, various other algorithms, priority rules, rule sets, computational models, and the like, may be used by the event identifying logic for determining upcoming events.

The data management module 110 receives the event information 1104 from the event determination module 124 and, in response, may determine a subset of user data 112 that is likely to be useful to the user for a particular event. For instance, the data management module may include data ranking logic 1124 that may prioritize or otherwise rank the user data for determining which user data to move on or off the electronic device 102 for a particular event. In some examples, the data ranking logic 1124 may include one or more algorithms, priority rules, rule sets, computational models, user preferences, or the like, configured to select particular pieces of user data for downloading to the local storage 1108, or for offloading from the local storage 1108. For instance, the data ranking logic 1124 may include a plurality of decision-making rules that may be applied to generate priority based rankings of the user data for downloading or offloading.

In some examples, the data ranking logic 1124 may include or may access a user data usage model 1126 that may include various other algorithms, priority rules, rule sets, computational models, and the like, that may be used by the event identifying logic to take into account numerous pieces of information related to various activities of the user, events that the user has participated in the past, preferences of the user, and so forth. Furthermore, the user data usage model 1126 may include machine learning capability to change the data ranking rules and priorities based on past user actions 1128, which may include user data usage during various categories of events (e.g., particular apps and content items used for particular event categories), user responses to past download or offload recommendations from the data management module 110, and other user feedback determined in response to earlier data rankings and recommendations provided by the data management module 110. In some examples, the user data usage model 1126 may include a trained statistical model of a type similar to that discussed above for the event model 1122, but trained based on the data download and offload preferences and actions of the user and/or plurality of other users.

As one example, based at least in part on receiving event information 1104 related to an upcoming event, the data management module 110 may use the data ranking logic 1124 and user data usage model 1126 to generate a first list of user data that is recommended for downloading to the local storage 1108, and a second list of user data that is recommended for offloading to the network storage 108. For example, the user data in the second list may be offloaded from the local storage 1108 to provide sufficient space in the local storage 1108 to enable download of the user data in the first list that is recommended by the data management module 110 for a particular event.

The data ranking logic 1124 and/or user data usage model 1126 may take into consideration a plurality of factors when ranking and determining user data to recommend for downloading and/or offloading for a particular event. For instance, based on the user data usage model 1126, priority rules, expressed user preferences, or other user data ranking techniques, the data ranking logic 1124 may determine which user data is likely to be used by the user during the particular event and which user data is unlikely to be used during the particular event, and may rank the user data according to these probabilities.

In some cases, the rankings of the user data may be based, at least in part, on the recentness of particular pieces of the user data. For instance, a recently purchased movie that has not yet been viewed by the user might be highly ranked and recommended for downloading to the local storage 108, while a recently viewed movie might be ranked lowly and recommended for offloading. For instance, if the user completely finished viewing a particular movie, then the particular movie might be recommended for offloading. On the other hand, if the user only viewed a portion of the movie, then the movie might not be recommended for offloading. Further, in some cases, a first portion of the movie that the user has already viewed might be recommended for offloading, while a second portion of the movie that the user has not yet viewed might be recommended to be retained in the local storage 1108 to enable the user to finish viewing the movie. As another example, the data ranking logic 1124 may take into consideration prior usage of user data by the user during similar events in the past (e.g., events categorized in a same or similar event category). For instance, if the user typically uses certain applications on a flight, during travel in a new city, while on a road trip, or during other particular categories of events, the data ranking logic 1124 may recommend that those applications and associated application data be downloaded to the local storage for an event categorized in a similar or same category.

In addition, the electronic device 102 may receive information 1130 about portions of the user data that are stored on other electronic devices 102 associated with the user. For example, the data ranking logic 1124 may consider whether other instances of particular pieces of user data are stored on other electronic devices that are proximate to the user or that are typically accessible by the user during certain categories of events. For example, if the electronic device 102 is a mobile phone, and the user usually also travels with a tablet, then the data ranking logic 1124 may take into consideration user data that is already on the tablet, or that will be loaded onto the tablet, when determining the lists of user data to recommend for downloading onto the phone or offloading from the phone. For instance, if a particular recently purchased movie is already stored on the tablet, then there may be a lower priority for the particular movie to also be downloaded onto the phone.

As one example, suppose that the user data is being recommended for an upcoming flight event, as in some examples described above. In such a case, particular factors considered for determining user data rankings may include: with whom the user is traveling; where the user is traveling to; whether the trip is for business or pleasure; with what other electronic devices is the user traveling; how long the flight will be; what the user typically uses the electronic device for on a flight, and so forth. Additionally, the recommendations for downloading and/or offloading user data may take into consideration whether the particular types of data are likely to be used during an offline period, e.g., in the case of a movie, TV show, book, or other content item, whether the user has completed viewing or otherwise consuming the content, and whether the user is likely to consume the content again during the offline period. For example, if the user has already consumed the content multiple times, then this may indicate that the user is likely to want to have the content available, such as in the case that the user is traveling with a child, and the child enjoys watching the same movie repeatedly.

As another example, the data ranking logic 1124 may take into consideration seasonal factors and various other time-based factors when determining likelihoods that particular pieces of data may be useful to the user during an event. For instance, if the holiday season is approaching and the user recently watched a particular movie related to the holidays, the data ranking logic may recommend another holiday-related movie, such as may be maintained in the user's movie library on the network storage 108.

In addition, the data management module 110 may include a data control module 1132 that can perform various functions for controlling the movement of user data into or out of the local storage 1108. As mentioned above, in some examples, the user may configure the data management module 110 to automatically offload the user data in the second ranked list, and automatically download the user data in the first ranked list. In other examples, the user may retain more control and may individually select or approve particular pieces of user data from the first list to be downloaded and/or pieces of user data from the second list to be offloaded. For instance, the user can select some or all of the user data in the first list that is recommended to be loaded onto the electronic device 102. In either event, after the data transfers have been completed, the user will be able to access the recommended data while the electronic device 102 is offline or otherwise being used during the event.

The data management module 110 may provide the first list and the second list as the data priority rankings 1106 to a user interface module 1134. The user interface module 1134 may present, on the display 138, the data recommended for download or offload in one or more GUIs, such as the GUIs discussed above with respect to FIGS. 4-6. The GUIs may provide the user with an opportunity to select content items, applications, or other user data to be downloaded onto the electronic device and/or offloaded from the electronic device. As mentioned above, the GUIs may present the user data recommended for downloading and/or offloading in a ranked order, which may be based at least in part on a category of the particular event.

In other examples, rather than presenting recommendations for user approval, the data management module 110 may proceed with downloading and/or offloading the recommended user data according the ranked order, and may present the user with information regarding storage locations where particular pieces of user data are stored. For instance, the data control module 1132 may interact with one or more communication interfaces 1136 to send any offloaded data 1140 to the network storage 108 and/or to receive any download data 142 from the network storage 108.

Figure 12:
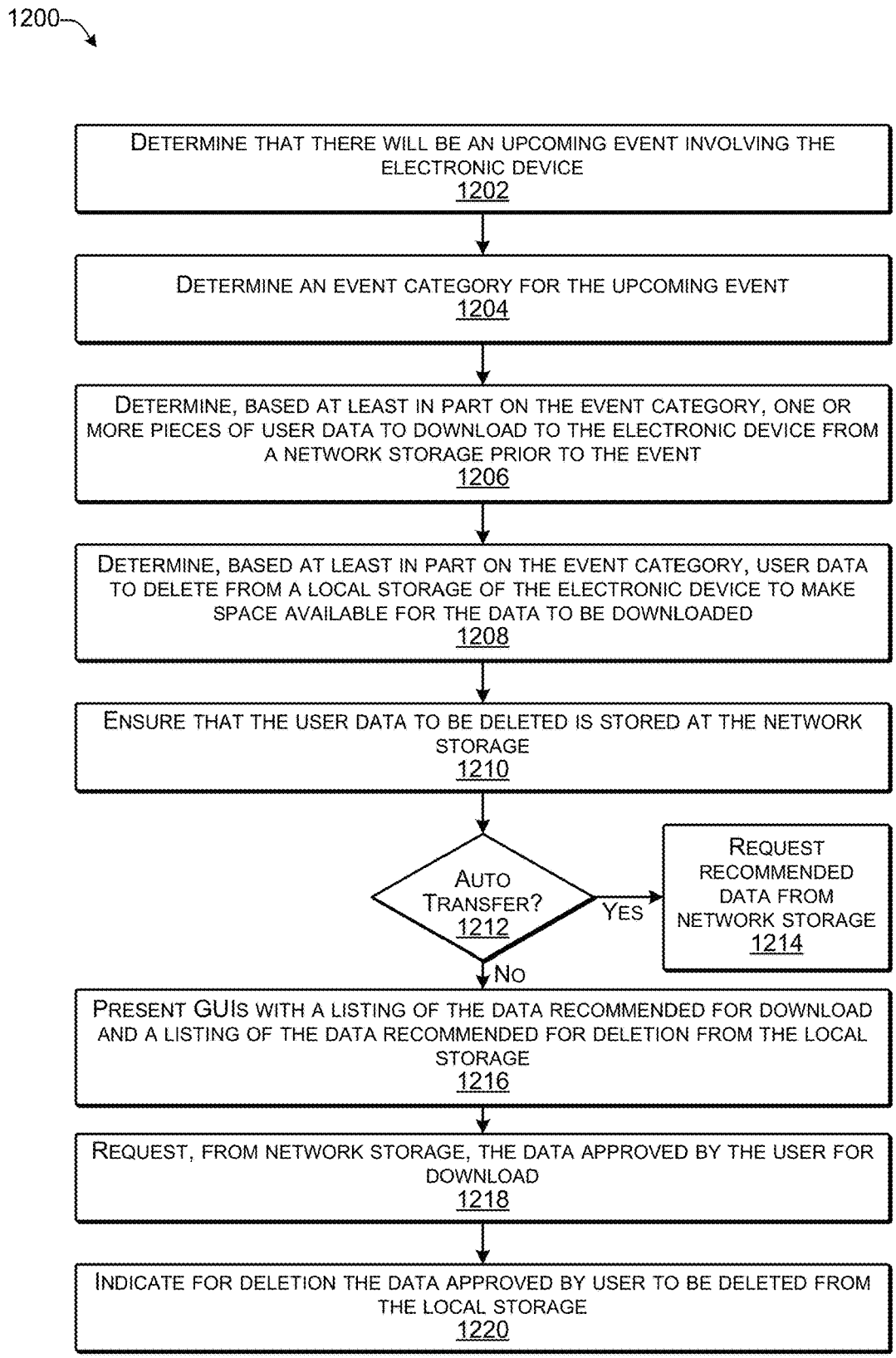
FIG. 12 is a flow diagram illustrating an example process for managing user data on an electronic device according to some implementations.
Figure 13:
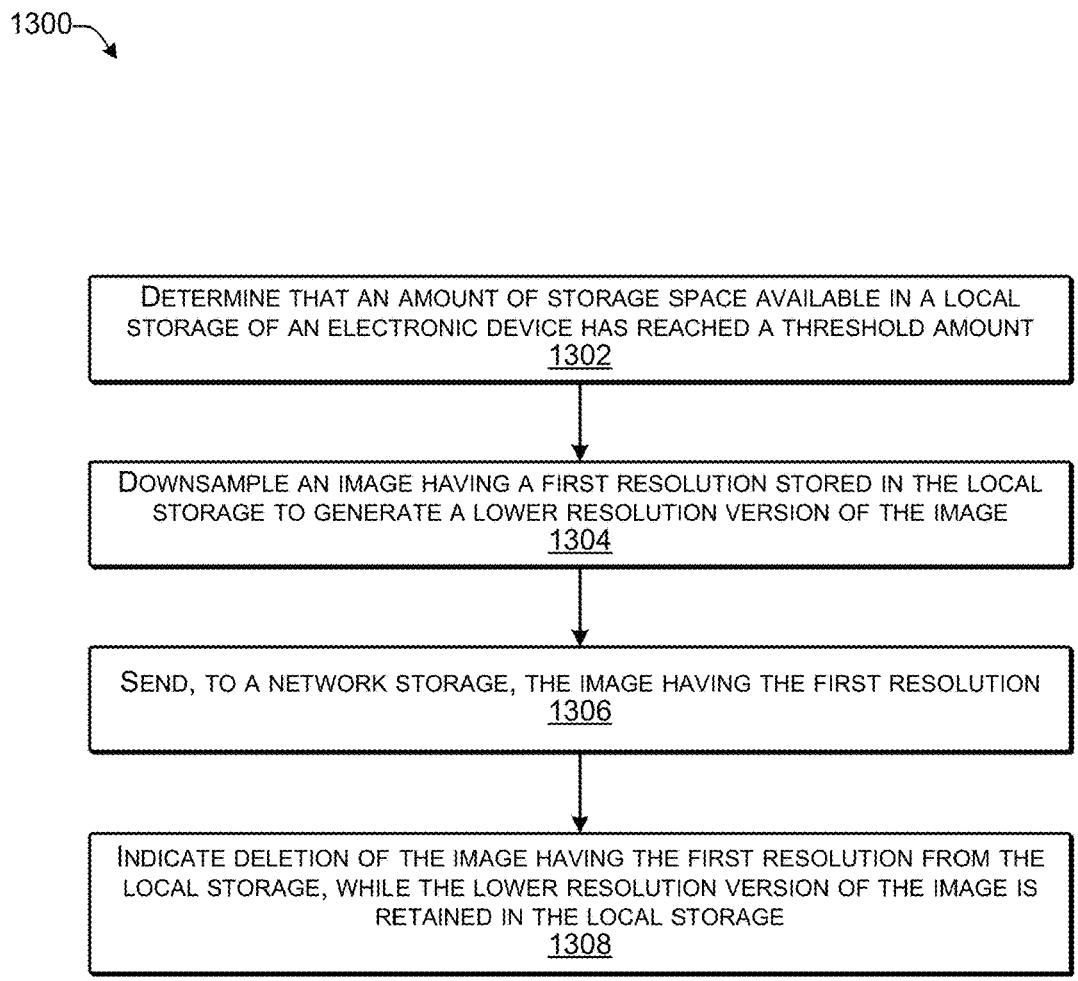
FIG. 13 is a flow diagram illustrating an example process for managing user data on an electronic device according to some implementations.
Figure 14:
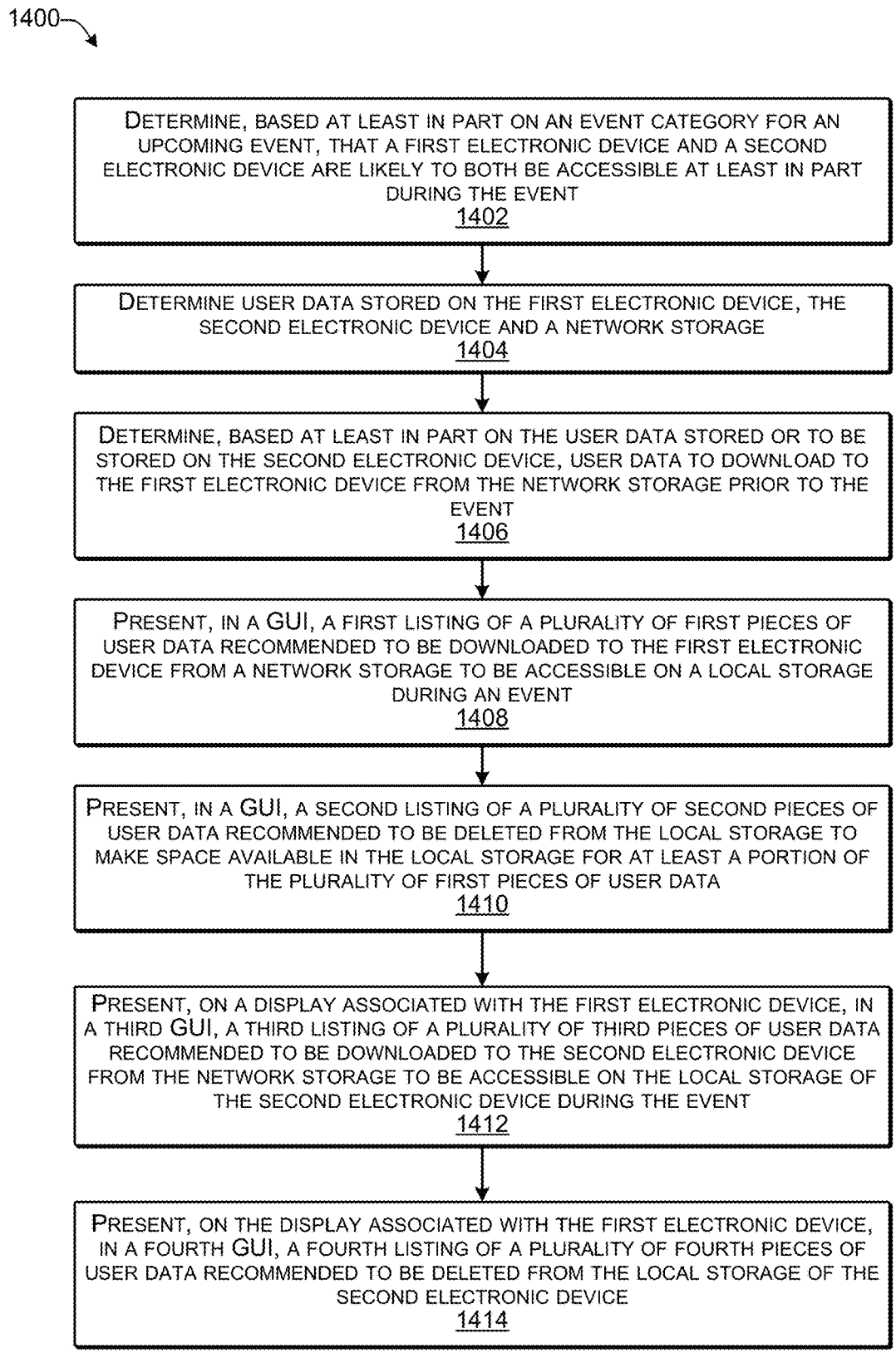
FIG. 14 is a flow diagram illustrating an example process for managing user data on an electronic device according to some implementations.

FIGS. 12-14 are flow diagrams illustrating example processes for managing data on an electronic device according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed.

For discussion purposes, the processes are described with reference to the environments, architectures and systems described in the examples herein, although the processes may be implemented in a wide variety of other environments, architectures and systems.

FIG. 12 is a flow diagram illustrating an example process 1200 for data management according to some implementations. In some examples, the process may be executed by the electronic device 102, or by another suitable computing device.

At 1202, the electronic device determines that there will be an upcoming event involving the electronic device. For example, the event determination module may identify an upcoming event based on one or more inputs, as discussed above with respect to FIG. 11.

At 1204, the electronic device determines an event category for the upcoming event. For instance, the event determination module may determine an event category based at least in part on particular activities associated with the event, such as whether the user is traveling, if so, whether the user is flying, driving, riding, taking a train, bus, etc., whether the device will be completely out of communication, or will have spotty connection, whether the event might cause the local storage to overflow, or the like.

At 1206, the electronic device may determine, based at least in part on the event category, one or more pieces of user data to download to the electronic device from a network storage prior to the event. For instance, for a particular event category, certain pieces of data may be determined based at least in part on data usage by the user during other events in the same category. Other factors may also be considered when determining the pieces of user data and the ranking of the pieces of user data.

At 1208, the electronic device may determine, based at least in part on the event category, user data to delete from a local storage of the electronic device to make space available for the data to be downloaded. Similarly, to 1206, for a particular event category, certain pieces of data may be determined based at least in part on data usage by the user during other events in the same category. Other factors may also be considered when determining the pieces of user data and the ranking of the pieces of user data.

At 1210, the electronic device may ensure that the user data to be deleted is stored at the network storage. For example, the electronic device may check to determine the last upload of the particular pieces of user data that are recommended to be deleted from the local storage.

At 1212, the electronic device may determine whether the user has authorized the data management module to automatically transfer recommended data onto the device and automatically delete recommended data from the local storage.

At 1214, if the user has approved automatic transfer by the data management module, the electronic device may request recommended data for download from the network storage. The data management module may further indicate that the data recommended for deletion is to be deleted from the local storage. For instance, the data management module may communicate with the operating system to mark the particular pieces of data for deletion from the local storage.

At 1216, the electronic device may present one or more GUIs with a listing of data recommended for download and a listing of data recommended for deletion from the local storage. Examples of such GUIs are discussed above with respect to FIGS. 3-4.

At 1218, the electronic device may request, from the network storage, data approved by user for download. For instance, if the user does not elect to have the recommended data automatically transferred onto the electronic device, the user may select or otherwise approve certain individual pieces of data, while not approving others.

At 1220, the electronic device may indicate for deletion the data approved by the user to be deleted from local storage. For instance, the data management module may communicate with the operating system to indicate particular pieces of data selected by the user to be deleted from the local storage.

FIG. 13 is a flow diagram illustrating an example process 1300 for data management according to some implementations. In some examples, the process may be executed by the electronic device 102 or by another suitable computing device.

At 1302, the electronic device may determine that an amount of available storage space remaining in a local storage of an electronic device has reached a threshold amount. For instance, a threshold for minimum available storage capacity remaining may be set on the electronic device for particular categories of events, and the threshold may vary from one category of event to another. For example, if the event category is one in which the user is adding large amounts of data to the local storage, such as when taking videos, the threshold may be substantially higher than an event category, such as an airplane flight, where the user in unlikely to add substantial amounts of additional user data during the event.

At 1304, the electronic device may downsample an image having a first resolution stored in the local storage to generate a lower resolution version of the image. Any of various suitable downsampling techniques may be used to generate a lower resolution version of the image, which will consequently occupy a substantially smaller storage area in the local storage.

At 1306, the electronic device may send, to a network storage, the image having the first resolution. If the image having the first resolution is not already stored on the network storage, the image may be sent to the network storage.

At 1308, the electronic device may indicate, for deletion from the local storage, the image having the first resolution, while the lower resolution version of the image is retained in the local storage. For instance, the image having the higher resolution may be marked for deletion, or otherwise indicated to be deleted from the local storage, thereby freeing up the storage space where the image is stored.

FIG. 14 is a flow diagram illustrating an example process 1400 for data management according to some implementations. In some examples, the process may be executed by the electronic device 102 or by another suitable computing device.

At 1402, a first electronic device may determine, based at least in part on an event category for an upcoming event, that the first electronic device and a second electronic device are likely to both be accessible at least in part during the event. For instance, if the event category is a flight, and past user data usage indicates that the user typically uses both a phone and a tablet on a flight, the data management module may determine that both electronic devices are likely to be accessible during an upcoming flight. In some examples, the data management module may request confirmation of this assumption when presenting the recommended data to the user.

At 1404, the first electronic device may determine which pieces of user data are stored on the first electronic device, which pieces are stored on the second electronic device and which pieces are stored on the network storage. For example, the data storage module 128 on the service computing device may keep track of which pieces of user data are stored on which electronic devices associated with a user, and may share this information with the data management module on the first electronic device.

At 1406, the first electronic device may determine, based at least in part on the user data stored, or to be stored, on the second electronic device, a plurality of pieces of user data to download to the first electronic device from the network storage prior to the upcoming event.

At 1408, the first electronic device may present, in a first GUI, a first listing of the plurality of first pieces of user data recommended to be downloaded to the first electronic device from the network storage to be accessible on a local storage during the upcoming event.

At 1410, the first electronic device may present, in a second GUI, a second listing of a plurality of second pieces of user data recommended to be deleted from the local storage to make space available in the local storage for at least a portion of the plurality of first pieces of user data.

At 1412, the first electronic device may present, on a display associated with the first electronic device, in a third GUI, a third listing of a plurality of third pieces of user data recommended to be downloaded to the second electronic device from the network storage to be accessible on the local storage of the second electronic device during the event. Thus, the first electronic device may present a GUI showing pieces of user data recommended for download to the second electronic device.

At 1414, the electronic device may present, on the display associated with the first electronic device, in a fourth GUI, a fourth listing of a plurality of fourth pieces of user data recommended to be deleted from the local storage of the second electronic device. Thus, the first electronic device may present a GUI showing pieces of user data recommended for deletion from the local storage of the second electronic device.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 15:
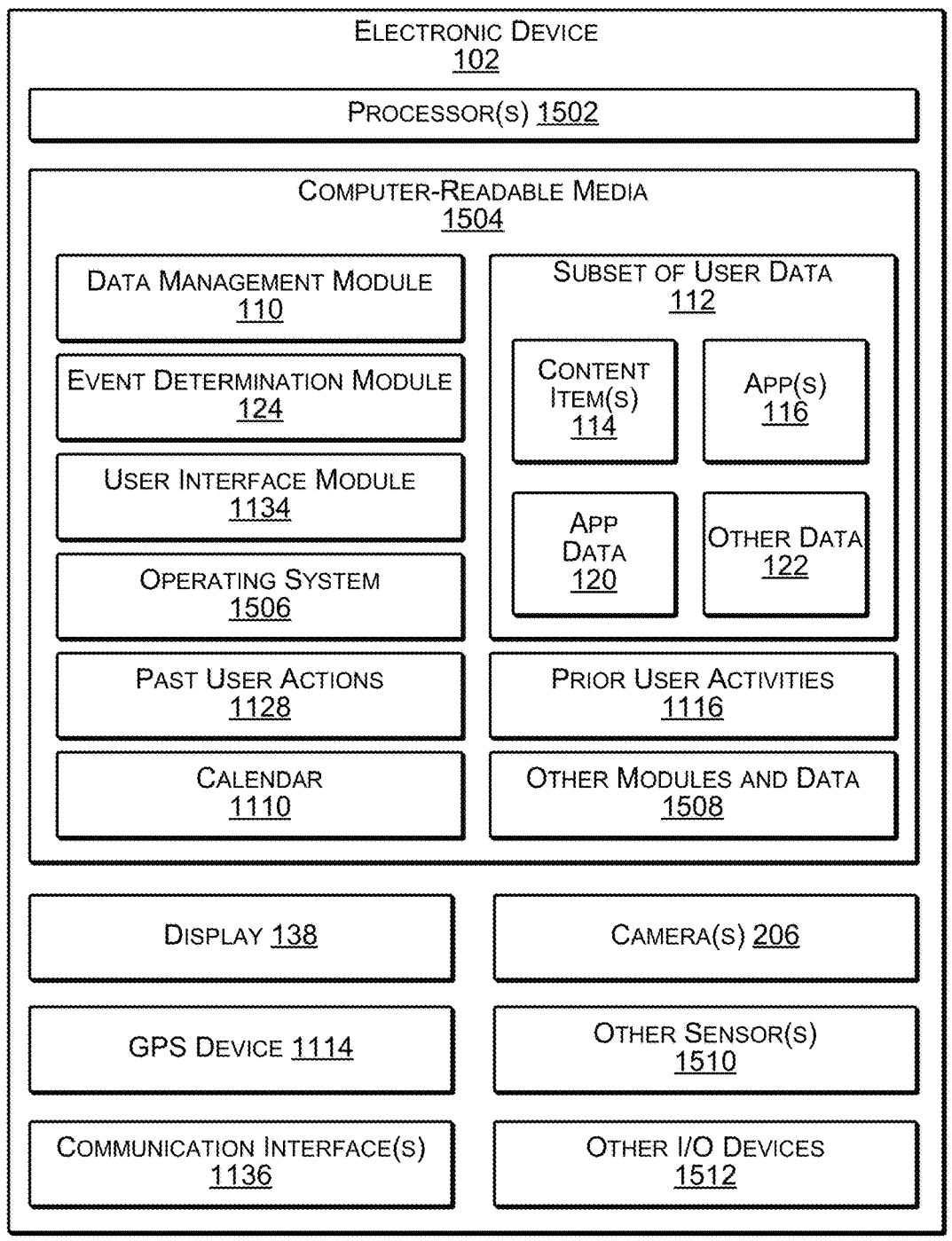
FIG. 15 illustrates select components of an example electronic device according to some implementations.

FIG. 15 illustrates select example components of the electronic device 102 that may implement the functionality described above according to some examples. The electronic device 102 may be any of a number of different types of computing devices, as enumerated above. In the example of FIG. 15, the electronic device 102 includes a plurality of components, such as at least one processor 1502, one or more computer-readable media 1504, the one or more communication interfaces 1136, and one or more input/output (I/O) devices 1514. Each processor 1502 may itself comprise one or more processors or processing cores. For example, the processor 1502 can be implemented as one or more microprocessors, microcomputers, microcontrollers, digital signal processors, central processing units, state machines, logic circuitries, and/or any devices that manipulate signals based on operational instructions. In some cases, the processor 1502 may be one or more hardware processors and/or logic circuits of any suitable type specifically programmed or configured to execute the algorithms and processes described herein. The processor 1502 can be configured to fetch and execute computer-readable processor-executable instructions stored in the computer-readable media 1504.

The computer-readable media 1504 may include, at least in part, the local storage 1108. Depending on the configuration of the electronic device 102, the computer-readable media 1504 may be an example of tangible non-transitory computer storage media and may include volatile and nonvolatile memory and/or removable and non-removable media implemented in any type of technology for storage of information such as computer-readable instructions, data structures, program modules, or other data. The computer-readable media 1504 may include, but is not limited to, RAM, ROM, EEPROM, flash memory, solid-state storage, magnetic disk storage, optical storage, and/or other computer-readable media technology. Further, in some cases, the electronic device 102 may access external storage, such as RAID storage systems, storage arrays, network attached storage, storage area networks, cloud storage, or any other medium that can be used to store information and that can be accessed by the processor 1502 directly or through another computing device or network. Accordingly, the computer-readable media 1504 may be computer storage media able to store instructions, modules, or components that may be executed by the processor 1502. Further, when mentioned, non-transitory computer-readable media exclude media such as energy, carrier signals, electromagnetic waves, and signals per se.

The computer-readable media 1504 may be used to store and maintain any number of functional components that are executable by the processor 1502. In some implementations, these functional components comprise instructions or programs that are executable by the processor 1502 and that, when executed, implement operational logic for performing the actions attributed above to the electronic device 102. Functional components of the electronic device 102 stored in the computer-readable media 1504 may include the data management module 110, the event determination module 124, and the user interface module 1134, as discussed above. Additional functional components may include an operating system 1506 for controlling and managing various functions of the electronic device 102 and for enabling basic user interactions with the electronic device 102. In some examples, the data management module 110, the event determination module 124, and the user interface module 1134 may be modules of the operating system 1506, while in other examples, some or all of these module may be separate from the operating system 1506.

The computer-readable media may store the subset 112 of the user data, such as content item(s) 114, application(s) 116, application data 120, and other data 122. In addition, the computer-readable media 1504 may also store data, data structures and the like, that are used by the functional components, such as past user actions 1128, prior user activities 1116, and the calendar 1110. Depending on the type of the electronic device 102, the computer-readable media 1504 may also store other functional components and data, such as other modules and data 1508, which may include applications, programs, drivers, etc., and other data used or generated by the functional components. Further, the electronic device 102 may include many other logical, programmatic and physical components, of which those described are merely examples that are related to the discussion herein.

The communication interface(s) 1136 may include one or more interfaces and hardware components for enabling communication with various other devices, such as over the network(s) 106 or directly. For example, communication interface(s) 1506 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

FIG. 15 further illustrates that the electronic device 102 may include the display 138. Depending on the type of computing device used as the electronic device 102, the display 138 may employ any suitable display technology. For example, the display 138 may be a liquid crystal display, a plasma display, a light emitting diode display, an OLED (organic light-emitting diode) display, an electronic paper display, or any other suitable type of display able to present digital content thereon. In some examples, the display 138 may have a touch sensor (not shown) associated with the display 138 to provide a touchscreen display configured to receive touch inputs for enabling interaction with a GUI presented on the display 138. Accordingly, implementations herein are not limited to any particular display technology. Alternatively, in some examples, the electronic device 102 may not include a display.

The electronic device 102 may further include the camera 206, the GPS device 1114, and other sensors 1510 such as an accelerometer, gyroscope, compass, proximity sensor, and the like.

The electronic device 102 may further include one or more other I/O devices 1512. The I/O devices 1512 may include speakers, a microphone, a camera, and various user controls (e.g., buttons, a joystick, a keyboard, a keypad, etc.), a haptic output device, and so forth. Additionally, the electronic device 102 may include various other components that are not shown, examples of which may include removable storage, a power source, such as a battery and power control unit, and so forth.

Figure 16:
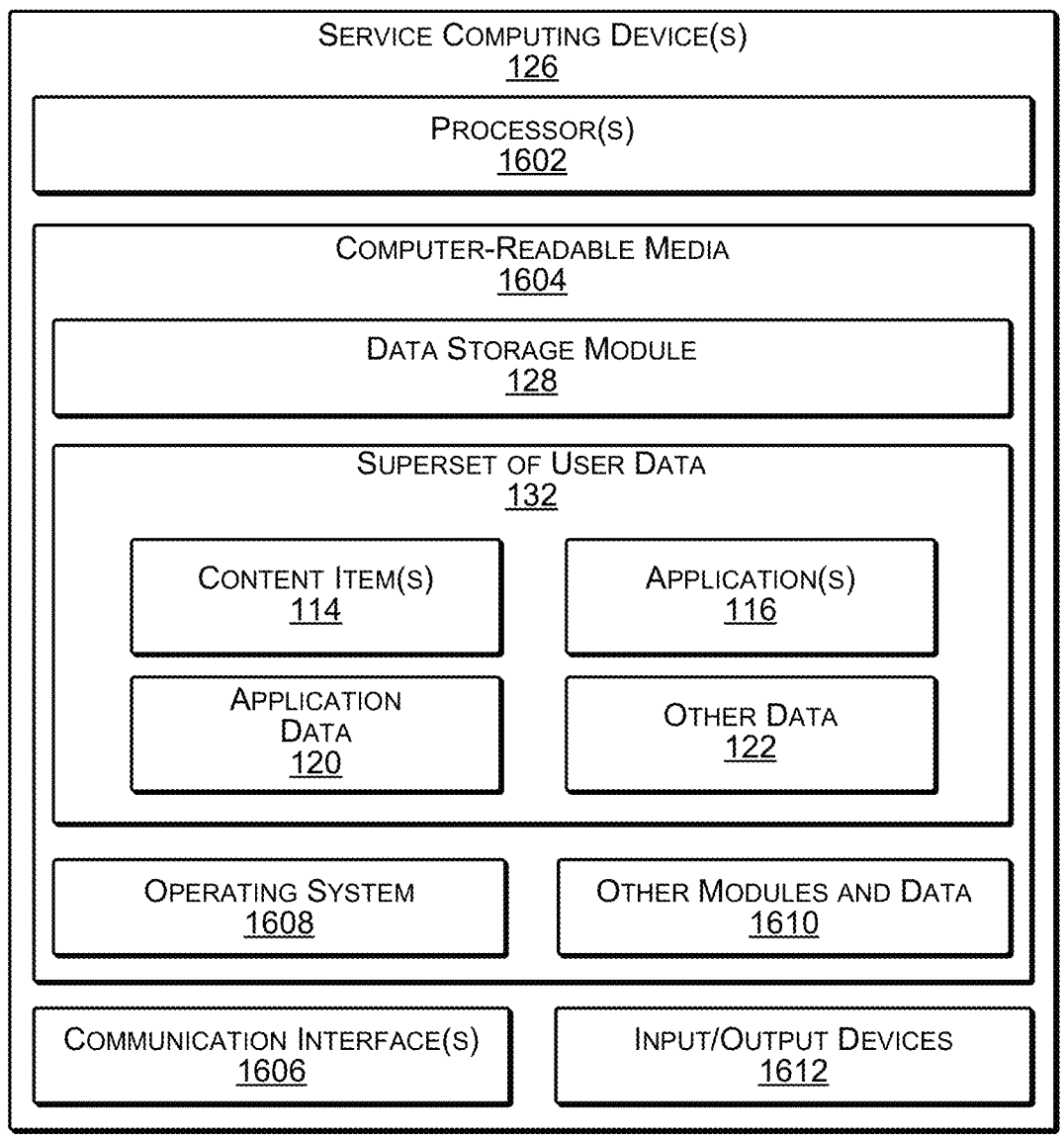
FIG. 16 illustrates select components of one or more example service computing devices according to some implementations.

FIG. 16 illustrates select components of the one or more service computing device(s) 126 that may be used to implement some functionality of the data management service described herein. In some examples, the service computing device 126 may be operated by a service provider that provides the network storage service, and may include one or more servers or other types of computing devices that may be embodied in any number of ways. For instance, in the case of a server, the modules, other functional components, and data storage (e.g., storage devices 130) may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 126 as being present in a single location, these components and data may alternatively be distributed across different computing devices and different locations in any manner Consequently, the functions may be implemented by one or more service computing devices, with the various functionality described above distributed in various ways across the different computing devices. Multiple service computing devices 126 may be located together or separately, and organized, for example, as virtual servers, server banks, and/or server farms. The described functionality may be provided by the servers of a single entity or enterprise, or may be provided by the servers and/or services of multiple different buyers or enterprises.

In the illustrated example, each service computing device 126 may include, or may have associated therewith, one or more processors 1602, one or more computer-readable media 1604, and one or more communication interfaces 1606. Each processor 1602 may be a single processing unit or a number of processing units, and may include single or multiple computing units or multiple processing cores. The processor(s) 1602 can be implemented as one or more microprocessors, microcomputers, microcontrollers, digital signal processors, central processing units, state machines, logic circuitries, and/or any devices that manipulate signals based on operational instructions. For instance, the processor(s) 1602 may be one or more hardware processors and/or logic circuits of any suitable type specifically programmed or configured to execute the algorithms and processes described herein. The processor(s) 1602 can be configured to fetch and execute computer-readable instructions stored in the computer-readable media 1604, which can program the processor(s) 1602 to perform the functions described herein.

The computer-readable media 1604 may include the storage devices 130 discussed above with respect to FIG. 1. In some cases, the storage devices 130 may be at the same location as the service computing device(s) 126, while in other examples, the storage devices 130 may be remote from the service computing device(s) 126. The computer-readable media 1604 may include volatile and nonvolatile memory and/or removable and non-removable media implemented in any type of technology for storage of information, such as computer-readable instructions, data structures, program modules, or other data. Such computer-readable media 1604 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 126, the computer-readable media 1604 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 1604 may be used to store any number of functional components that are executable by the processors 1602. In many implementations, these functional components comprise instructions or programs that are executable by the processors 1602 and that, when executed, specifically configure the one or more processors 1602 to perform the actions attributed above to the service computing device 126. Functional components stored in the computer-readable media 1604 may include the data storage module 128. Additional functional components stored in the computer-readable media 1604 may include an operating system 1608 for controlling and managing various functions of the service computing device 126.

In addition, the computer-readable media 1604 may store data used for performing the functions and services described herein. Thus, the computer-readable media 1604 may store the superset of user data 132, which may include content items 114, applications 1116, application data 120, and other data 122. The service computing device 126 may also include or maintain other functional components and data, such as other modules and data 1610, which may include programs, drivers, etc., and the data used or generated by the functional components. Further, the service computing device 126 may include many other logical, programmatic, and physical components, of which those described above are merely examples that are related to the discussion herein.

The communication interface(s) 1606 may include one or more interfaces and hardware components for enabling communication with various other devices, such as over the network(s) 106. For example, communication interface(s) 1606 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

The service computing device 126 may further be equipped with various input/output (I/O) devices 1612. Such I/O devices 1612 may include a display, various user interface controls (e.g., buttons, joystick, keyboard, mouse, touch screen, etc.), audio speakers, connection ports and so forth.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method of data management, the method comprising:
   determining, by one or more processors, that both a first electronic device and a second electronic device are to be accessible at least in part during an event;
   determining user data stored on the first electronic device, the second electronic device, and a network storage; and
   determining, based at least in part on the user data stored on, or to be stored on, the second electronic device prior to the event, user data to download to the first electronic device from the network storage prior to the event.

2. The method of claim 1, further comprising:
   presenting, on a display associated with the first electronic device, in a first graphic user interface, a first listing of a plurality of first pieces of user data recommended to be downloaded to the first electronic device from the network storage to be accessible on a local storage of the first electronic device during the event; and
   presenting, on the display, in a second graphic user interface, a second listing of a plurality of second pieces of user data recommended to be deleted from the local storage to make space available in the local storage for at least a portion of the first plurality of pieces of user data.

3. The method of claim 1, further comprising presenting, on a display associated with the first electronic device, in a graphic user interface, a listing of a plurality of pieces of user data recommended to be downloaded to the second electronic device from the network storage to be accessible on a local storage of the second electronic device during the event.

4. The method of claim 1, further comprising presenting, on a display associated with the first electronic device, in a graphic user interface, a listing of a plurality of pieces of user data recommended to be deleted from a local storage of the second electronic device.

5. The method of claim 1, further comprising determining the event based at least in part on at least one of:
- a user input to the first electronic device providing event information for the event;
- prior user activities related to the first electronic device;
- indicated geographic location of the first electronic device; or
- a calendar maintained on the first electronic device.

6. The method of claim 1, further comprising determining one or more pieces of user data to recommend for download to the first electronic device prior to the event based on at least one of:
- recentness associated with the one or more pieces of user data;
- past user actions indicative of data usage during past events; or
- a predicted use of the first electronic device during the event.

7. The method of claim 1, further comprising:
- downsampling an image maintained in a local storage of the first electronic device to generate a lower-resolution version of the image; and
- indicating the image for deletion to make storage space available in the local storage.

8. The method of claim 1, wherein the first electronic device and the second electronic device are determined to be accessible during the event based at least in part on an event category for the event.

9. An apparatus for data management, the apparatus being a first electronic device, the apparatus comprising:
- a memory; and
- at least one processor coupled to the memory and configured to:
  - determine that both the first electronic device and a second electronic device are to be accessible at least in part during an event;
  - determine user data stored on the first electronic device, the second electronic device, and a network storage; and
  - determine, based at least in part on the user data stored on, or to be stored on, the second electronic device prior to the event, user data to download to the first electronic device from the network storage prior to the event.

10. The apparatus of claim 9, wherein the at least one processor is further configured to:
- present, on a display associated with the first electronic device, in a first graphic user interface, a first listing of a plurality of first pieces of user data recommended to be downloaded to the first electronic device from the network storage to be accessible on a local storage of the first electronic device during the event; and
- present, on the display, in a second graphic user interface, a second listing of a plurality of second pieces of user data recommended to be deleted from the local storage to make space available in the local storage for at least a portion of the first plurality of pieces of user data.

11. The apparatus of claim 9, wherein the at least one processor is further configured to present, on a display associated with the first electronic device, in a graphic user interface, a listing of a plurality of pieces of user data recommended to be downloaded to the second electronic device from the network storage to be accessible on a local storage of the second electronic device during the event.

12. The apparatus of claim 9, wherein the at least one processor is further configured to present, on a display associated with the first electronic device, in a graphic user interface, a listing of a plurality of pieces of user data recommended to be deleted from a local storage of the second electronic device.

13. The apparatus of claim 9, wherein the at least one processor is further configured to determine the event based at least in part on at least one of:
- a user input to the first electronic device providing event information for the event;
- prior user activities related to the first electronic device;
- indicated geographic location of the first electronic device; or
- a calendar maintained on the first electronic device.

14. The apparatus of claim 9, wherein the at least one processor is further configured to determine one or more pieces of user data to recommend for download to the first electronic device prior to the event based on at least one of:
- recentness associated with the one or more pieces of user data;
- past user actions indicative of data usage during past events; or
- a predicted use of the first electronic device during the event.

15. The apparatus of claim 9, wherein the at least one processor is further configured to:
- downsample an image maintained in a local storage of the first electronic device to generate a lower-resolution version of the image; and
- indicating the image for deletion to make storage space available in the local storage.

16. The apparatus of claim 9, wherein the first electronic device and the second electronic device are determined to be accessible during the event based at least in part on an event category for the event.

* * * * *